US010452247B2

(12) United States Patent
Stephens et al.

(10) Patent No.: US 10,452,247 B2
(45) Date of Patent: Oct. 22, 2019

(54) INTEGRATED AGENT PLAYER-CLIENT MANAGEMENT SYSTEM AND METHOD WITH AUTOMATED EVENT TRIGGER INITIATED COMMUNICATIONS

(71) Applicant: DStephens & Associates Partnership, St. Louis, MO (US)

(72) Inventors: Derek Stephens, St. Louis, MO (US); Allain R. Roy, St. Louis, MO (US)

(73) Assignee: DStephens & Associates Partnership, St. Louis, MO (US)

( * ) Notice: Subject to any disclaimer, the term of this patent is extended or adjusted under 35 U.S.C. 154(b) by 167 days.

(21) Appl. No.: 15/060,409

(22) Filed: Mar. 3, 2016

(65) Prior Publication Data

US 2016/0259538 A1 Sep. 8, 2016

Related U.S. Application Data

(60) Provisional application No. 62/127,526, filed on Mar. 3, 2015.

(51) Int. Cl.
| | |
|---|---|
| G06F 17/20 | (2006.01) |
| G06F 3/0484 | (2013.01) |
| G06F 3/0481 | (2013.01) |
| H04L 29/08 | (2006.01) |
| H04L 12/58 | (2006.01) |

(52) U.S. Cl.
CPC ...... *G06F 3/04847* (2013.01); *G06F 3/04817* (2013.01); *G06F 3/04842* (2013.01); *H04L 51/04* (2013.01); *H04L 51/36* (2013.01); *H04L 67/26* (2013.01); *H04L 67/306* (2013.01); *H04L 51/32* (2013.01)

(58) Field of Classification Search
None
See application file for complete search history.

(56) References Cited

U.S. PATENT DOCUMENTS

| | | |
|---|---|---|
| 4,977,503 A | 12/1990 | Rudnick et al. |
| 5,412,188 A | 5/1995 | Metz |
| 5,527,033 A | 6/1996 | Puma et al. |
| 5,636,920 A | 6/1997 | Shur et al. |

(Continued)

*Primary Examiner* — Keith D Bloomquist
(74) *Attorney, Agent, or Firm* — Sandberg Phoenix & von Gontard P.C.

(57) ABSTRACT

A system providing a system user integrated player-client management services and functions with enhanced communications between a system user and a player-client defined by the system user having a user resource manager (URM) resident on a computing device of a system user. The URM having player-client profiles with player-client parameters that player-client reporting parameters and player-client action triggers. The URM providing player-client profile page displays, transmitting to a remote device a player-client reporting parameter and in response receiving instant player-client data/updates and updating the player-client profile with the instant player-client data. The URM comparing the received instant player-client data with a player-client action trigger detecting in near real time an occurrence of an resource action event and generating an alert action to the computing device providing the system user an indication on the computing device that the resource action event was detected.

27 Claims, 10 Drawing Sheets

(56) References Cited

U.S. PATENT DOCUMENTS

| | | |
|---|---|---|
| 6,371,855 B1 | 4/2002 | Gavriloff |
| 6,631,522 B1 | 10/2003 | Erdelyi |
| 6,656,042 B2 | 12/2003 | Reiss et al. |
| 6,669,565 B2 | 12/2003 | Liegey |
| 6,691,063 B1 | 2/2004 | Campbell et al. |
| 6,996,444 B2 | 2/2006 | Ach, III |
| 7,142,933 B1 | 11/2006 | Puma et al. |
| 7,620,466 B2 | 11/2009 | Neale et al. |
| 7,646,914 B2 | 1/2010 | Clausi et al. |
| 7,699,707 B2 | 4/2010 | Bahou |
| 8,433,540 B1 | 4/2013 | Saltzman et al. |
| 8,509,929 B1 | 8/2013 | Hughes et al. |
| 9,003,294 B1 * | 4/2015 | Ames .................. G06Q 10/10 715/739 |
| 2004/0162799 A1 | 8/2004 | Schisler et al. |
| 2005/0164792 A1 | 7/2005 | Wilcock |
| 2005/0187644 A1 | 8/2005 | Neale et al. |
| 2006/0183548 A1 | 8/2006 | Morris et al. |
| 2006/0217198 A1 | 9/2006 | Johnson |
| 2006/0252476 A1 | 11/2006 | Bahou |
| 2007/0021165 A1 | 1/2007 | Ma et al. |
| 2008/0268951 A1 | 10/2008 | Gropp et al. |
| 2008/0281444 A1 | 11/2008 | Krieger et al. |
| 2010/0063607 A1 | 3/2010 | Neale et al. |
| 2011/0153686 A1 | 6/2011 | Campbell et al. |
| 2011/0237317 A1 | 9/2011 | Noonan et al. |
| 2013/0072307 A1 | 3/2013 | Heller et al. |
| 2013/0167162 A1 | 6/2013 | Fernandez |
| 2013/0260898 A1 | 10/2013 | Pepe et al. |
| 2015/0360133 A1 * | 12/2015 | MacCallum .......... A63F 13/828 463/42 |

* cited by examiner

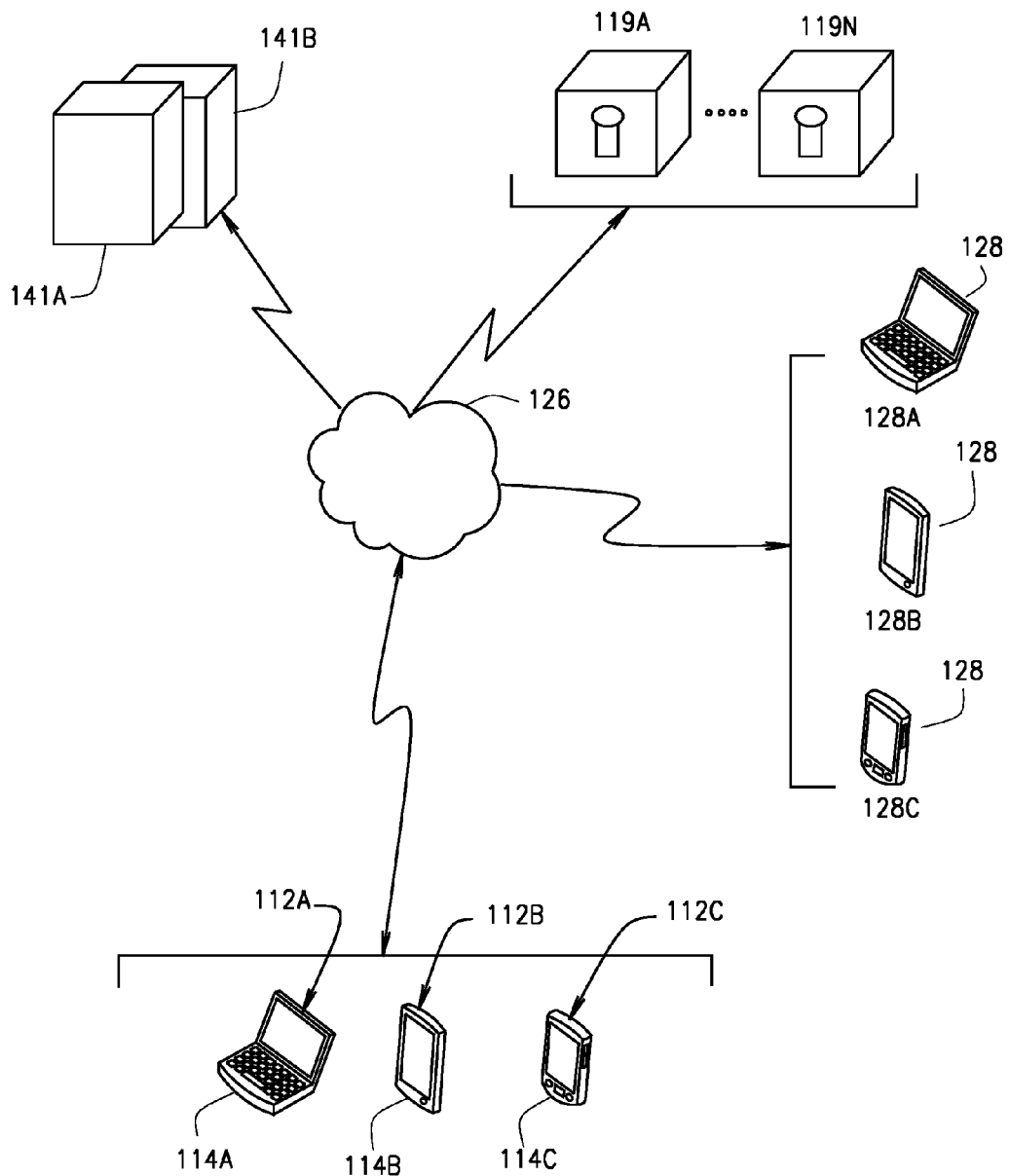
F I G . 1

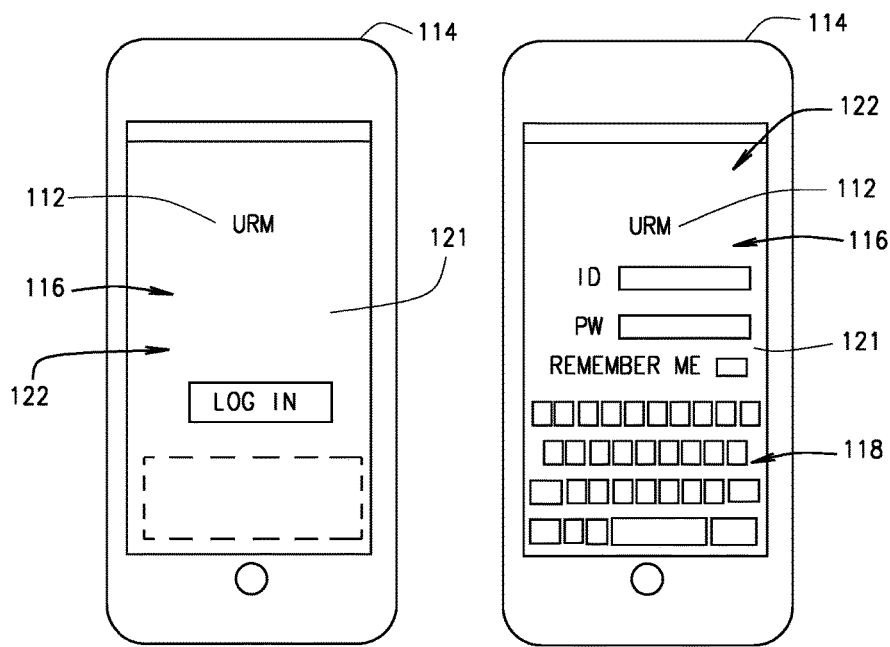
FIG. 5
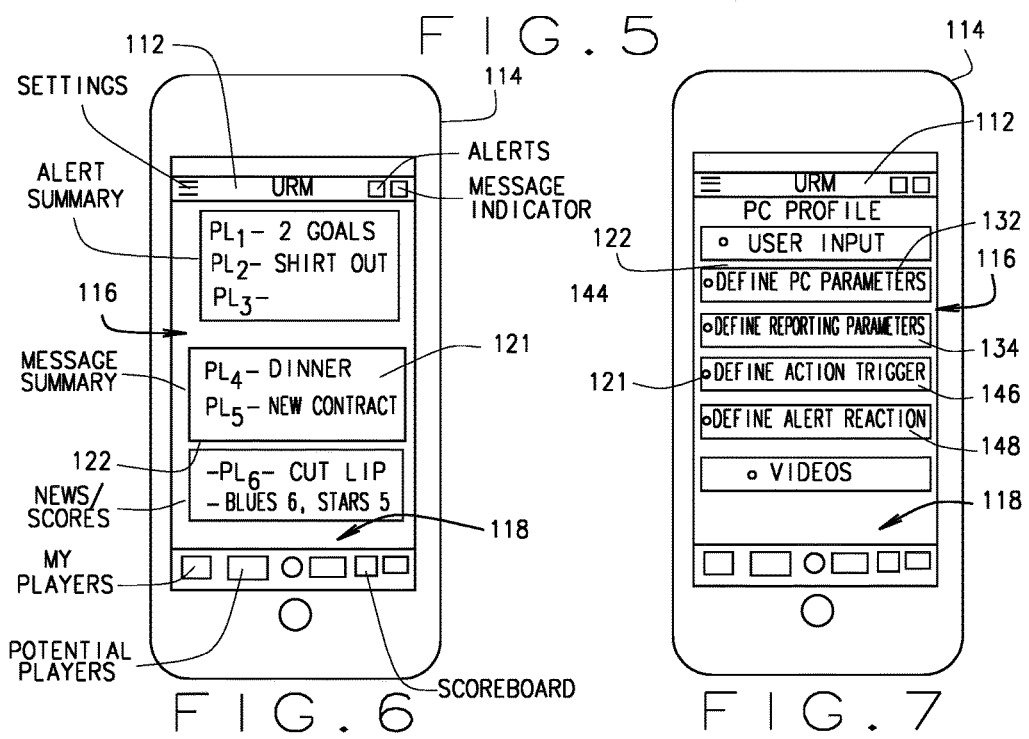
FIG. 6
FIG. 7

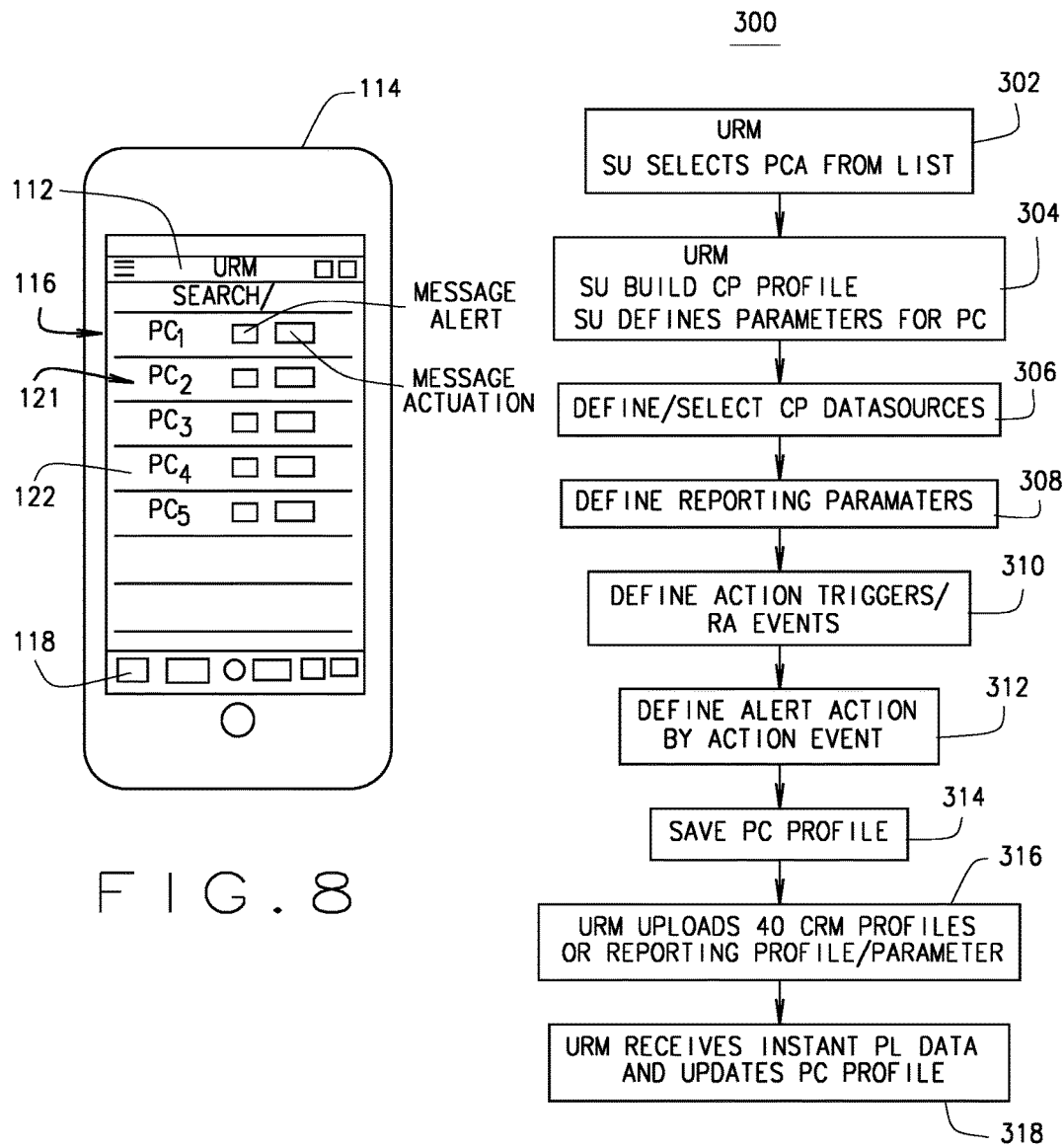

INTEGRATED AGENT PLAYER-CLIENT MANAGEMENT SYSTEM AND METHOD WITH AUTOMATED EVENT TRIGGER INITIATED COMMUNICATIONS

CROSS-REFERENCE TO RELATED APPLICATIONS

This application claims the benefit of U.S. Provisional Application No. 62/127,526, filed on Mar. 3, 2015, the disclosure of which is incorporated herein by reference.

FIELD

The present disclosure relates to systems and methods for functional integration and interoperability of sports data and, more specifically, to a system and method for enhanced integrated communications that includes utilizing automated communication triggers based on monitored and compared predefined player-client data.

BACKGROUND

The statements in this section merely provide background information related to the present disclosure and may not constitute prior art.

Computers and mobile computing devices are ubiquitous in the increasing connected information age. However, with all of the devices and communications networks and systems and media, it is often still difficult for a business person to capture, review and evaluate all of the desired data and to utilize that data to improve business efficiency. The computing devices are often merging or available on duplicated platforms and available data is becoming more easily accessible such as in remote access or cloud storage and computing, but individuals often cannot fully utilize these to effectively improve their business functions. To the contrary, these many sources of data, devices and constantly available communications bandwidth often creates more inefficiency and can create or add to the information overload induced attention deficit hyperactivity disorder (ADHD) for those attempting utilize all of the available data. If you want to find out statistics, news headlines, a profile or information about something or someone, on-line data is available with relative ease to those who know where to look, but finding and gathering actually useful data can be tedious and inefficient.

Further, computing devices have evolved such that these devices have numerous software applications or apps that are developed by separate and distinct entities and each of which can be accessed by a use of the portable computing device, but each of which has its own procedures, system user interface screens and functionality and lack thereof. While there are available links for transporting data and data importing and linking of certain app functionality, and the computing devices are increasing enabling multiple tasking, the system user of the current mobile devices and apps do not have an ability to merge data and functionality for improved efficiency. This is particularly the case with professional sports agents that can often have 25 to 50 player-clients 104 that they represent or they are considering to represent.

Starting out in the morning, a sports agent wakes early to review the most up to date statistics about the agent's player-clients 104 or potential player-clients 104. This often entails active players or potential players, each of which may currently be involved in numerous different leagues throughout the world. These players may be in different sports or playing in the same sport at different levels. During a season in which the player is active, the player may have had a game the night before or in the last few days or weeks. The agent will typically review his current emails, check for telephone calls, telephone messages, text messages or the like to see if any player or team or another agent contacted them. If a player had a game the night before, the agent typically looks at his player-client list and calendar and starts at the top of the list looking at each player finding out what they did the night before. This often entails using a web browser or application for that particular game or league or possible a pull data or push data application for such league or sport. Based on the review of each player's activities, the agent may want to initiate a communication to the player-client. In such cases, the agent must open the appropriate app such as the directory or an email, phone or text app in order to create a message or communication with the player. For instance, it could be as simple as a text message to a player such as "good game last night" or as is appropriate under the circumstance. Further, in today's world of social media, the agent is also likely to log on to their Twitter, Facebook or similar social media website account as they are most likely following their player-clients for any posts or statements or their updating of their status. The agent needs to monitor their player-client social presence as the social presence of a player can directly impact the player-client's contract or relationship with their team or their marketability. A typical sports agent may perform these tasks for numerous ones of their player-clients, which can often take more than a couple of hours of their typical morning.

The agent then often has scheduled meetings or conference calls with player-clients, perspective player-clients, scouts, current and potential teams related to contracts, performance, medical or health issues, trades, free agency, future signings, and future drafts. The agent will typically utilize his Outlook or similar calendar app of his computing device to aid in the scheduling and coordination of such activities. During all of this, the agent is required to be readily available to player-clients 104, future player-clients 104, as well as team representatives.

The agent is also likely to be evaluating his player-client's opportunities for the future as to contract terms, performance and value, which requires further analysis of statistics of not only the player-client, but also in comparison to other players or comparable players and contracts. The agent also must be constantly aware of current player-client activities and watch as many player-client games so that the agent can have personal knowledge of the player-client performances for both discussions with the player-client, as well as teams and the press. Agents have become reliant on being constantly connected to the information age and regularly utilize numerous communications, web browsing, social media, and scheduling and calendaring applications, and constantly maneuvering from one to another, while taking written notes the entire time.

With all of these computing systems and applications, the resources available to the agent are substantial, however the accessing and utilization of such resources are constrained and time consuming and maneuvering between the numerous required systems are a constant demand for time and decreased efficiency.

SUMMARY

The inventors hereof have recognized the above identified problem and need for improved integration of timely available player-client data along with enhanced communications between the agent and player-clients 104 and third parties and has succeeded at designing a system, including apparatuses and methods, for enabling simplified and easy compilation of required data by the agent and enhanced integrated communications, between the agent and one or more of the agent's player-clients 104 and teams and third part.

In one aspect, a system provides a system user integrated player-client management services and functions with enhanced communications between a system user and a player-client defined by the system user having a user resource manager (URM) resident on a computing device of a system user. The URM having player-client profiles with player-client parameters that player-client reporting parameters and player-client action triggers. The URM providing player-client profile page displays, transmitting to a remote device a player-client reporting parameter and in response receiving instant player-client data/updates and updating the player-client profile with the instant player-client data. The URM comparing the received instant player-client data with a player-client action trigger detecting in near real time an occurrence of an resource action event and generating an alert action to the computing device providing the system user an indication on the computing device that the resource action event was detected.

Various other aspects of the present disclosure will be in part apparent and in part pointed out below. It should be understood that the disclosed various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 1 is schematic of a system according to one exemplary embodiment of this disclosure.

FIG. 5 provides two views of URM GUI screen presentation for an initial login to the URM on a mobile phone computing device as one exemplary embodiment of the URM.

FIG. 6 is a front view a URM GUI screen presentation illustrating a main menu screen for a mobile application implementation of the URM according to one exemplary embodiment.

FIG. 7 is a front view a URM GUI screen presentation illustrating a player-client profile set up or build screen for a mobile application implementation of the URM according to one exemplary embodiment.

FIG. 8 is a front view a URM GUI screen presentation illustrating a URM My Player-Client or URM My Potential Player-Client screen for a mobile application implementation of the URM according to one exemplary embodiment.

FIG. 9 is a flow chart for the URM for setting up and creating a player-client profile according to one example.

It should be understood that throughout the drawings, corresponding reference numerals indicate like or corresponding parts and features.

DETAILED DESCRIPTION

The following description is merely exemplary in nature and includes various exemplary embodiments and the invention as claimed is not intended to limit to any specific exemplary embodiment or to limit this disclosure's applications or uses except as limited by law.

As will be described herein, the presently disclosed system and methods provide a new and novel service capability to a user and in particular a user of computing devices that are increasingly becoming mobile computing devices. Various technologies and design choices are available for implementation of these systems and methods. In particular, system functionality between that which is implemented in the user computing device as enabled by a user application and that which is implemented in one or more centralized server that is often referred to as backend server or mobile web server or service, but that can be of any structure, architecture or form as such technology may evolve from time to time. By way of one present exemplary embodiment, this will be described here to fit within as a "smart client" application architecture. However, those of skill in the art will understand that one or more of the functions and operations and methods as described to be within the user computing device application or "client" and the application server can be in the range from that of a "thin client" architecture, a web page hosting client, to a "thick client" architecture and still be within the scope of the present disclosure. Further, as known in the art, implementation technologies vary by computing platform and by design choice as to being a native or cross-platform implementation. In some embodiments the computing device application can be developed as a native application for a particular mobile device and operating system, such as Android™, BlackBerry™ OS, and Apple™ OS by ways of examples. However, as one of ordinary skill in the art will understand, it is an increasing trend due to higher availability of consistent broadband connectivity that implementations will increasingly be device agnostic and become more browser-based with the computing device acting as an application user interface to an application specific website on the application/backend server. As such, this disclosure utilizes a selected "smart client" architecture using a selected one exemplary mobile application technology (Apple™) as one exemplary embodiment and this selection is not intended to be limited thereto as one of ordinary skill in the art will understand upon review.

Figure 2:
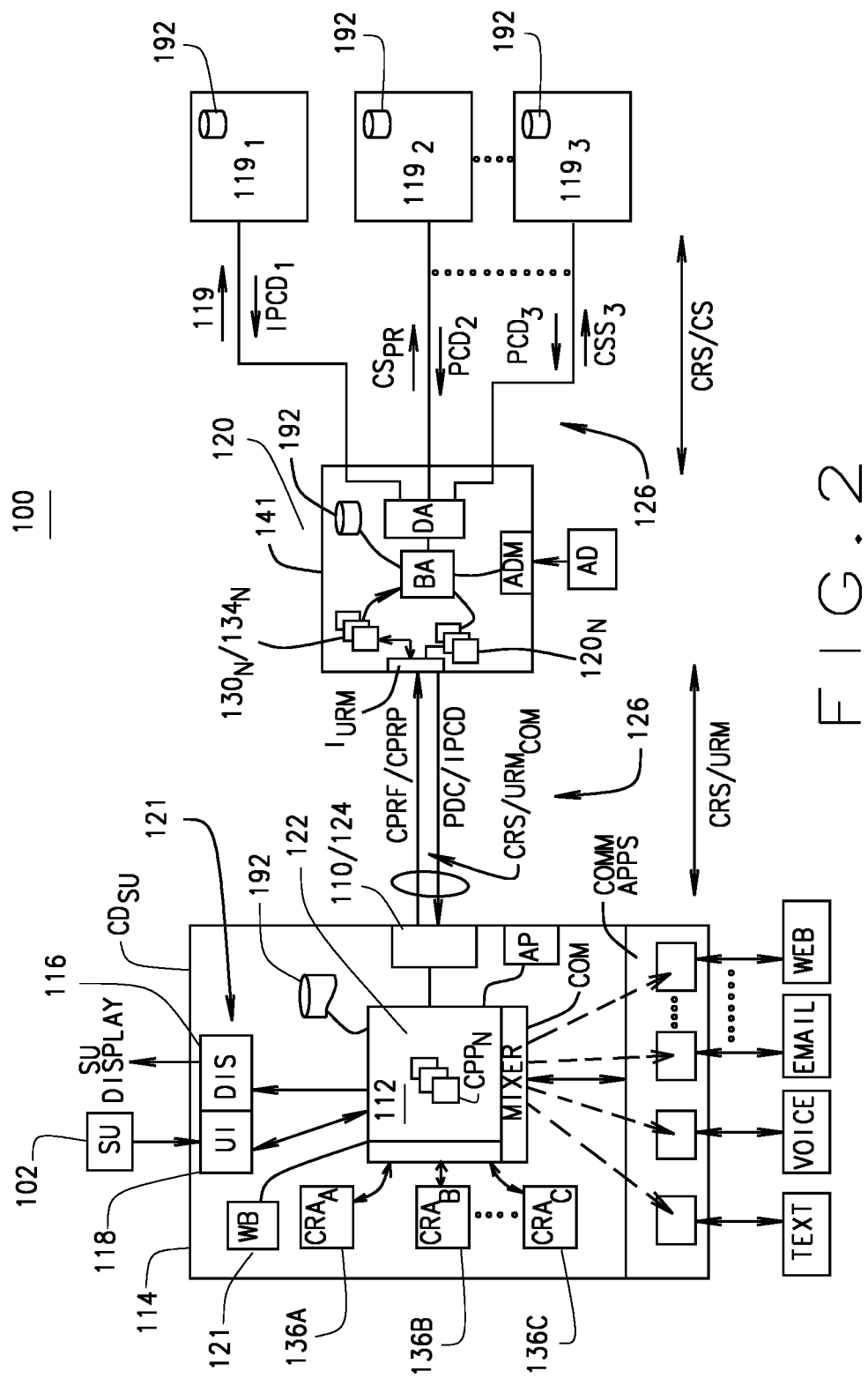
FIG. 2 is a block diagram of the system components and subcomponents for the system recourse manager SRM, the user resource manager URM and interactions with content services according to one exemplary embodiment of this disclosure.
Figure 3:
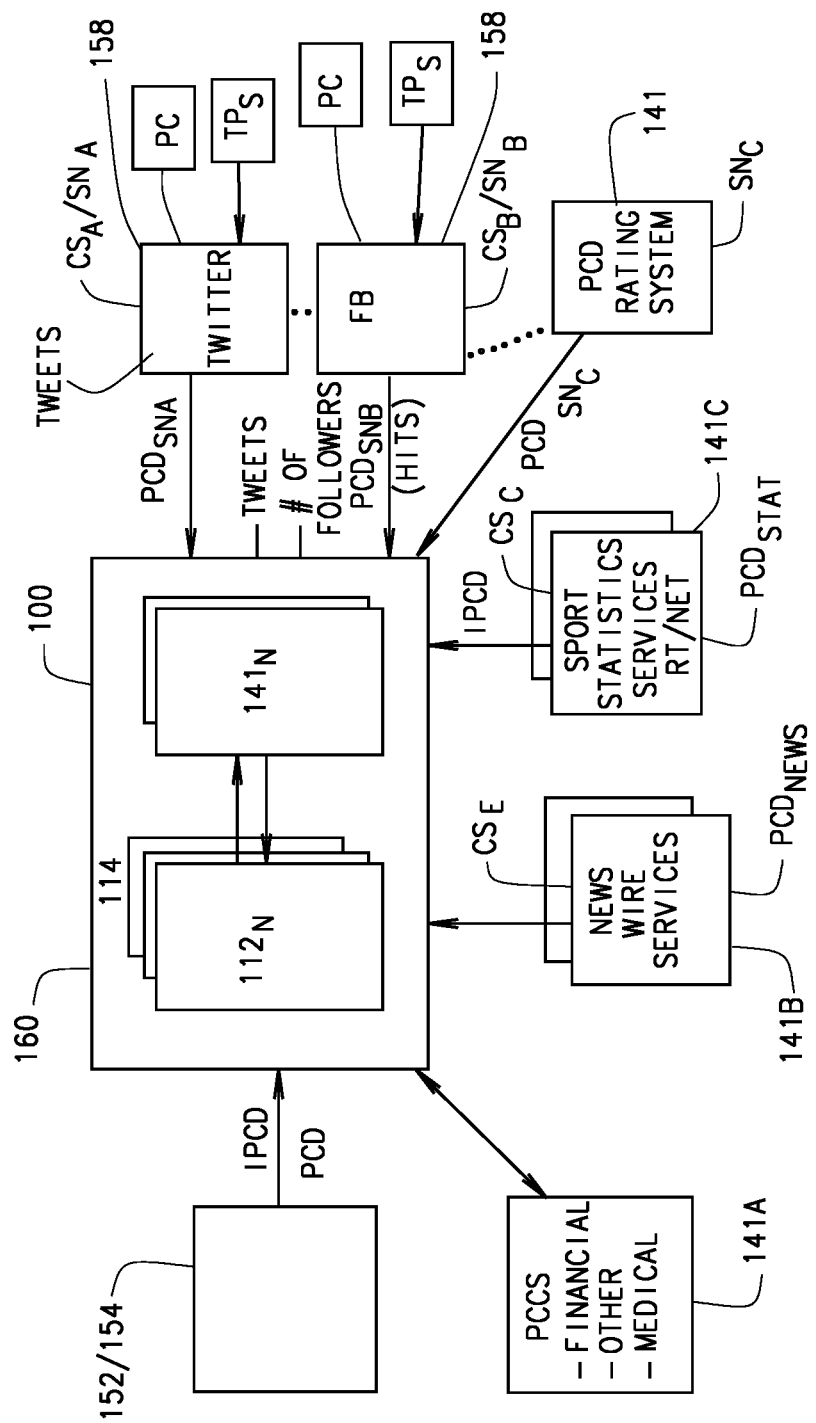
FIG. 3 is a block diagram of external resource interfaces of the system with external systems according to one exemplary embodiment.
Figure 4:
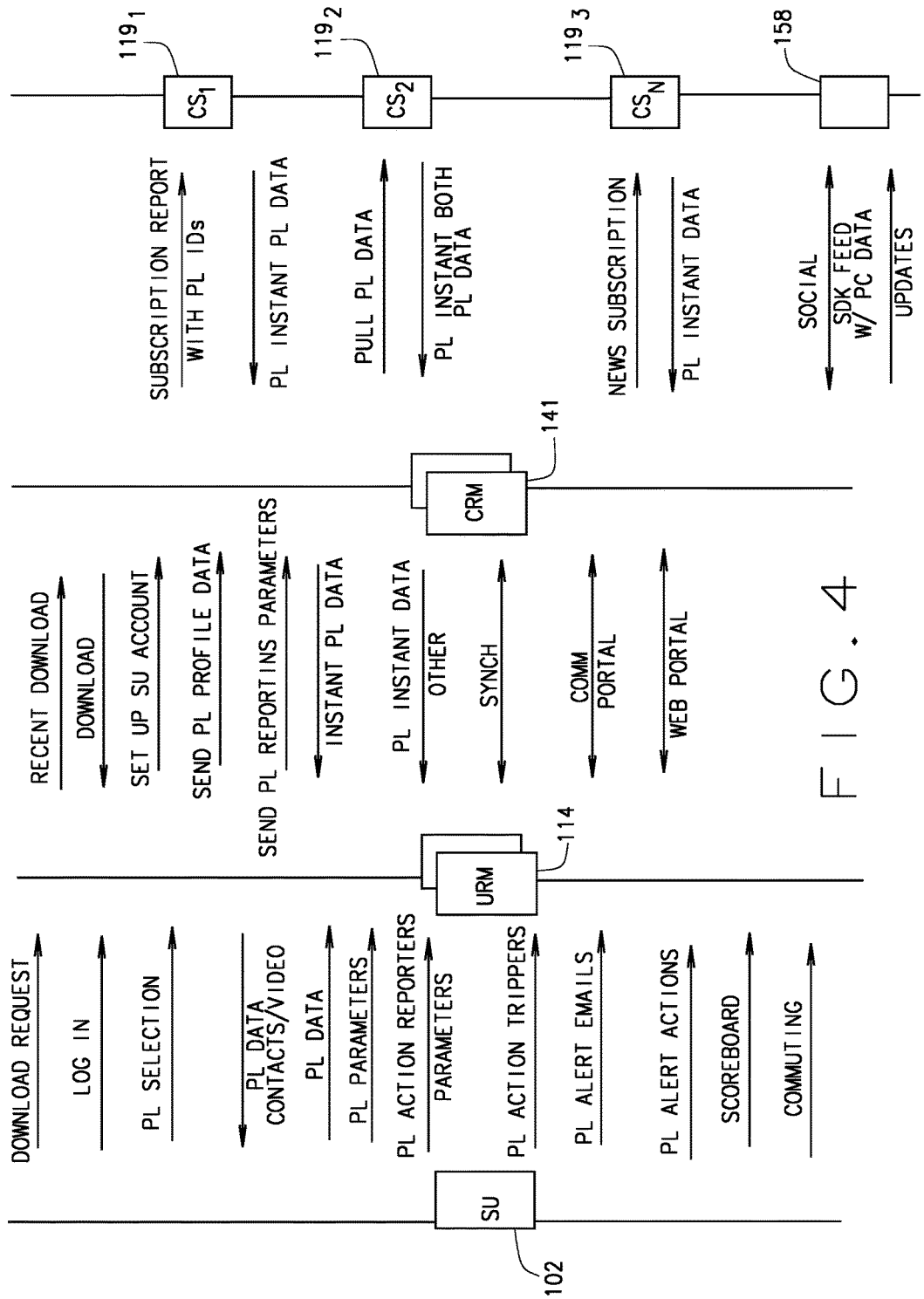
FIG. 4 is a process flow timing diagram illustrating some of the data flows between the URM and SRM system components as well as the system user of the URM and the interactions between the SRM and external systems such as content services and web services.

In one embodiment as illustrated in FIGS. 2-4, the present disclosure includes, among other elements, an agent client management system 100, and its method of operation as will be described, provides a new and improved resource management functionality and services to its agent/system users 102 that includes automated tracking of predetermined player-clients 104 in real time as to their accomplishments, their statistics, predetermined milestones or requirements and predetermined objectives and data. The system 100 also provides, in some embodiments, the functional integration of system 100 with various social media platforms 108 for the providing and obtaining of player-client 104 statistics and data and the improved and enhancing use thereof for use in initiating internal and external actions. The system 100 includes functional integration of a communication portal/interface 110 (also referred to as a communication interface 110 within the agent client management system 100 to provide newly integrated automated or enabled actions to be taken based on comparative, determined or developed criteria that meets or matches predefined agent action goals, objectives, or alert thresholds, for each such, individually or in one or more combinations, based on algorithms or processes and decision within the system 100, or as provided by one or more external systems 140.

In some embodiments, the system 100 provides a system user 102 with an integrated player-client management service and experience with functions having enhanced communications between a system user 102 and a player-client 104 defined by the system user 102. The system 100 includes user resource manager (URM) 112 that resides on a user computing device 114 of a system user 102 having a user device display 116 and a user device interface 118. The URM 112 is composed of one or more (a plurality) of resource modules 120 providing a graphical interface 121 in the form of URM pages 122 displayed on the user device display 116 of the user computing display 114. The user computing device 114 has a communications interface 124 that provides communications session over a communications network 126 to a client communication device 128 of each player-client 104 for which the system user 102 has pre-selected or pre-identified.

The URM 112 includes one or more player-client profile 130 for each player-client 104 with each player-client profile 130 being for one of the player-clients 104 previously selected by the system user 102 and having one or more player-client parameters 132 that includes one or more player-client reporting parameters 134 and one or more player-client action triggers 136. The URM 112 provides a plurality of player-client profile 130 page displays 138 as a part of the displayed URM pages 122. The URM 112 transmits to a remote device 140 at least a portion of at least one of the player-client profiles 130 for each player-client 104 as the player-client reporting profile 142 including the one or more player-client reporting parameters 134. In response to such transmission, the URM 112 receives instant player-client data 144 from the remote device 140 and updates at one of the player-client profiles 130 related to such data with the instant player-client data 144. The URM 112 compares the received instant player-client data 144 with a player-client action trigger 136 for such as defined in the player-client profile 130 to detect or identify, in at least near real time if not real time, an occurrence of a resource action event 146. In response to detecting a resource action event 146, the URM 112 generates an alert action 148 to a user device component 150 of the user computing device 114 of the system user 102 with the alert action 148 being configured to provide an indication to the system user 102 via or on the user computing device 114 that the resource action event 146 was detected and did occur.

In some embodiments, the alert action 148 is the generation of an message that can include, but is not limited to an automated communication prompt on the user computing device 114 thereby prompting and enabling the system user 102, or another user device module or component 150 of the user computing device 114 or the system 100 to initiate a communication from the user computing device 114 of the system user 102 within the URM 112. This initiated communication can include one or more of any type of communication including to the client communication device 128 of the player-client 104, a third party communication device 152 owned and operated by a third party 154 (not the system user 102 or the player-client 104). This communication can being via a one-step response action performed by the system user 102 in response to the alert action 148 such as a communication prompt 148, and/or in some embodiments can be configured via predetermined instructions and code to automatically initiate such alert action 148 without requiring the system user 102 to take any action, as predefined by the system user 102 in a reporting resource action 156 of one of the player-client profiles 130 as a client player resource action event 146.

In some embodiments, the communication prompt includes a computing device user notification either within the URM 112 or external to the URM 112 utilizing a co-resident user device notification feature such as an icon, a vibration, or a sound.

In some embodiments, the alert action 148 such as a communication prompt includes an icon, a banner, a window or a badge on the display of the user computing device 114 and that includes a hotlink for initiating the communication upon activation or selection by the system user 102.

In some embodiments, the alert action 148 can be a generated or displayed message includes the automated communication prompt on the URM display of the user computing device 114 of the system user 102 providing the system user 102 with a window within the URM 112 identifying the player-client 104. The URM 112 identifies the instant player-client data 144 or the determined resource action event 146 and generates a display of an automated communication icon or window or banner to initiate the communication to the player-client 104 upon activation or selection by the system user 102 of the automated communication prompt.

In some embodiments, the communication is initiated as a text message, an Instagram, a chat, a multimedia message, an email message, a voice telephone call, a posting on a website and an entry or posting on a blog, by ways of example.

In some embodiments, the URM 112 includes an application programming interface (API) 164 integrating a co-resident communication application of the user computing device 114 within the URM 112. The integrated co-resident communication application can be initiated by the communication prompt of the alert message. These can include, but are not limited to, a text or multimedia message application, an email application, a voice telephone call application, a social networking application, a website application, and a content service 119 application.

In some embodiments, the alert message and the communication prompt are predefined and stored in the player-client profile 130 by the system user 102 for the player-client 104.

In some embodiments, the communication prompt includes a player-client communication address retrieved either from an external directory co-resident on the system user 102 user computing device 114 or as entered and stored in the player-client profile 130 by the system user 102.

In some embodiments, the URM 112 includes an application programming interface (API) 164 integrating or incorporating the functionality of a co-resident application or accessible application of the user computing device 114 such as, by way of example, a calendar, a web browser, a contact list, a directory, a telephone application, a text or multimedia application, a memory that can include nontransitory memory or transitory memory depending on the implementation, a camera or video capture application, and email application, and an alerting application.

In some embodiments, the system user 102 is a sports agent and the player-client 104 is an athlete who is a client or a prospective client (referred herein simply as a player-client 104) of the sports agent. In such embodiments, one or more content server can be a sport statistics data base server and the received instant player-client data is an athlete event criteria of the player-client 104 during a sporting event in which the player-client 104 is participating.

In some embodiments, the player-client reporting parameter 134, player-client reporting data and instant player-client data can includes one or more athlete event criteria such as, only by way of example and not intending to be limited thereto, goal scored, assist, blocked shot, runs or points scored, distance gained, goal against, penalty, tackles, hits, and sacks.

In some embodiments, the wherein, for whatever athlete event criteria is selected, the player-client action trigger 136 is a predefined quantity or threshold for such athlete event criteria.

In some embodiments, the user resource manager URM 112 includes a social networking application interface on the user computing device 114 configured for receiving social networking data such as status update from the co-resident social networking application or hosted webpage thereon of the player-client 104. The URM 112 receives the player-client social networking update and provides the received player-client social networking update to the player-client profile 130. The player-client reporting data includes social networking data updates and the resource action response/trigger is responsive to the resource action defined as a player-client social networking update.

In some embodiments, the player-client 104 reporting parameter and instant player-client 104 data/update includes news updates a made available from a news content server. The URM 112 receives transmitting instant player-client news update stores such in the player-client profile 130, and generates the alert on the user computing device 114 in response to the received player-client news update being compared to a news update event trigger as pre-defined in the player-client profile 130.

In some embodiments, the player-client 104 reporting parameter and instant player-client 104 data/update includes social networking posts, tweets, comments or likes and the URM 112 receives transmitted social networking updates from a social networking content server including player-client data as instant player-client data/updates. The URM 112 stores such in the player-client profile 130 of the URM 112 and generates the alert on the user computing device 114 in response to the receiving of a social networking event trigger as defined in the player-client profile 130.

In some embodiments, the player-client 104 profile reporting parameter 134 of the URM 112 includes an updated social networking influence score and receives from a social networking scoring content server including player-client data. The URM 112 receives updated social networking influence score for inclusion in the player-client profile 130. The alert can be generated on the user computing device 114 in response to the receiving of the updated social networking influence score being a social network influence score trigger as defined in the player-client profile 130.

In some embodiments, the social networking influence score is a Klout score, the player-client data is a current Klout score for the player-client 104-client, and the social network influence score trigger is a predefined value to which the received updated social networking in some embodiments, the user interface 118 of the URM 112 is configured for receiving user client input for creating one or more of the following: each player-client profile 130, defining the player-client profile 130 page displays 138, defining each player-client parameter 132 including each player-client reporting parameter 134, each player-client action trigger 136, each resource action even and each alert message associated therewith.

In some embodiments, the player-client data of the player-client profile 130 includes one or more player-client parameters 132, player-client reporting parameters 134, instant player-client data and player-client action triggers 136 include one or more parameters defined by a team contract, or a promotions contract. In such embodiments, the resource action event 146 and alert action 148 can include a prompt or automated communication prompt on the user computing device 114 to initiate a communication from the user computing device 114 of the system user 102 within the URM 112 to a third party communication device 152.

In some embodiments, the user interface 118 of the URM 112 includes an input screen option for uploading or selecting a co-resident or remotely stored and accessible video clip of the player-client 104. The player-client profile 130 can store multimedia data files including a video clip and to display the multimedia data files including the video clip on the display.

The system 100 can also include a remote device 140 having a system user interface application communicatively interfacing to a plurality of remotely situated User Resource Manager (URM) 112 applications each being associated with a different system user 102. The remote system 140 includes a content services 119 interface communicating with one or more content servers with each content server providing player-client data that includes instant player-client data in real time or near real time to a player-client event. The system user interface 118 receives from one of the URMs 112 a plurality of player-client reporting profiles 142 for a particular system user 102 where each player-client reporting profile 142 for a system user 102 being for a different selected player-client 104 of the system user 102 and one or more player-client reporting parameters 134. The content services 119 interface receives from the content server player-client data associated with at least one of the player-client reporting parameters 134 of a particular one of the player-clients 104 which includes player-client reporting data in at least near real time identifying an activity or event to which the particular player-client 104-client is participating. The system user interface 118 transmitting at least a portion of the received player-client reporting data as instant player-client data in at least near real-time to the URM 112 with which the player-client profile 130 is associated.

The remote device/remote system 140 can be a centralized resource system (CRS) 141 back office server for the URM 112 providing URM 112 application updates, support and business functionality, the remote device 140 having player-client data acquisition manager defining the content services 119 interface for subscribing to or obtaining the player-client reporting data from at least one of the content servers, the player-client data acquisition manager identifying the player-client reporting data and creating therefrom the instant player-client data 144 as a function of the received player-client reporting parameters 134.

In some embodiments, the player-client data acquisition manager is configured for interfacing and obtain player-client reporting data from a content server selected from the list of servers consisting of a news content server, a sports statistics server, a social networking website server 158, a scoring server, an influence determination server, and a promotion management server.

In some embodiments, the remote device 140 includes a communication system interface for interfacing with a website or communication services server selected from the group consisting of an instant messaging server, a text messaging server, a chat, an email server, a voice telephone call server, a social networking server 158, and a website server.

In some embodiments, the alert message of the URM 112 includes an automated communication prompt on the user computing device 114 enabling the system user 102 to automatically initiate a communication from the user computing device 114 of the system user 102 to the player-client 104 within the URM 112 by communicating through the communication interface 110 to the remote device 140 and as established by the communication system interface of the remote device 140.

The present system 100 and method, in one embodiment, includes a remote application server generally referred here simply as a remote device 140 has a centralized resource enabler system CRS 141 and a system user computing device 114 that can be fixed or increasingly is a mobile computing device or referred herein as a user computing device 114 having a notification and communication manager, such as a mobile application or "app" referred herein to as the system user resource manager URM 112 as a shorthand, but as will be described in greater detail in the following disclosure. The system user resource manager URM 112 is typically a mobile application resident from a download on the user computing device 114 that is integrated within into the operational, control and third party application interfaces thereon. The user computing device 114 is generally communicatively couplable via a communication network 126 to the remote device 140 in a proprietary manner for interchanging application code, system user data, notifications and other data between the centralized resource manager and the user resource manager as will be described herein or understood by those of ordinary skill in the art upon reviewing the present disclosure. The remote device 140 and in some embodiments the mobile device are communicatively coupled via a communication network 126 to third-party devices 152 such as third party data base services, data service servers, and application servers, and client devices that are fixed or mobile communications devices owned and operated by "clients" of the system user 102 and third parties.

In one exemplary embodiment, a system 100 provides a system user integrated player-client management services and functions with enhanced communications between a system user 102 and a player-client defined by the system user 102 having a user resource manager (URM) 112 resident on a user computing device 114 of a system user 102. The URM 112 having player-client profiles 130 with player-client parameters 132 that player-client reporting parameters 134 and player-client action triggers 136. The URM 112 providing player-client profile 130 page displays 138, transmitting to a remote device 140 a player-client reporting parameter 134 and in response receiving instant player-client data 144/updates and updating the player-client profile 130 with the instant player-client data 144. The URM 112 comparing the received instant player-client data 144 with a player-client action trigger 136 detecting in near real time an occurrence of an resource action event 146 and generating an alert action 148 to the user computing device 114 providing the system user 102 an indication on the user computing device 114 that the resource action event 146 was detected.

FIG. 4 provides a timing process flow between the system user 102, the URM 114, the CRM 141 and the various content services 119 including social media servers 158, by way of examples.

FIGS. 5-8 and 11-13 provide GUI pages 122 for the URM 112 on the client device 114. FIG. 5 illustrates the GUI pages 122 of the user device 114 showing a login screen for a user 102. FIG. 6 illustrates one of the URM pages 122 showing the alert and message indicators, an alert summary for various player-clients (PL) 104 of the system user 102, a message summary such as for making dinner plans with a player client 104, as well as a news and scores summary. Additional features can include icons for accessing other URM features and functions. FIG. 7 illustrates a URM page 122 for a player-client profile 130 for input or review player-client data 144 such as defining player-client parameters 134, player-client action triggers 146, and alerts 148 and alert actions 148. FIG. 8 is a URM page 122 illustration showing a listing of the player-clients 104 of the system user 102 such as including player client data 144 such as message alerts and message activation on the GUI 212 using the GUI URM pages 122.

Figure 10:
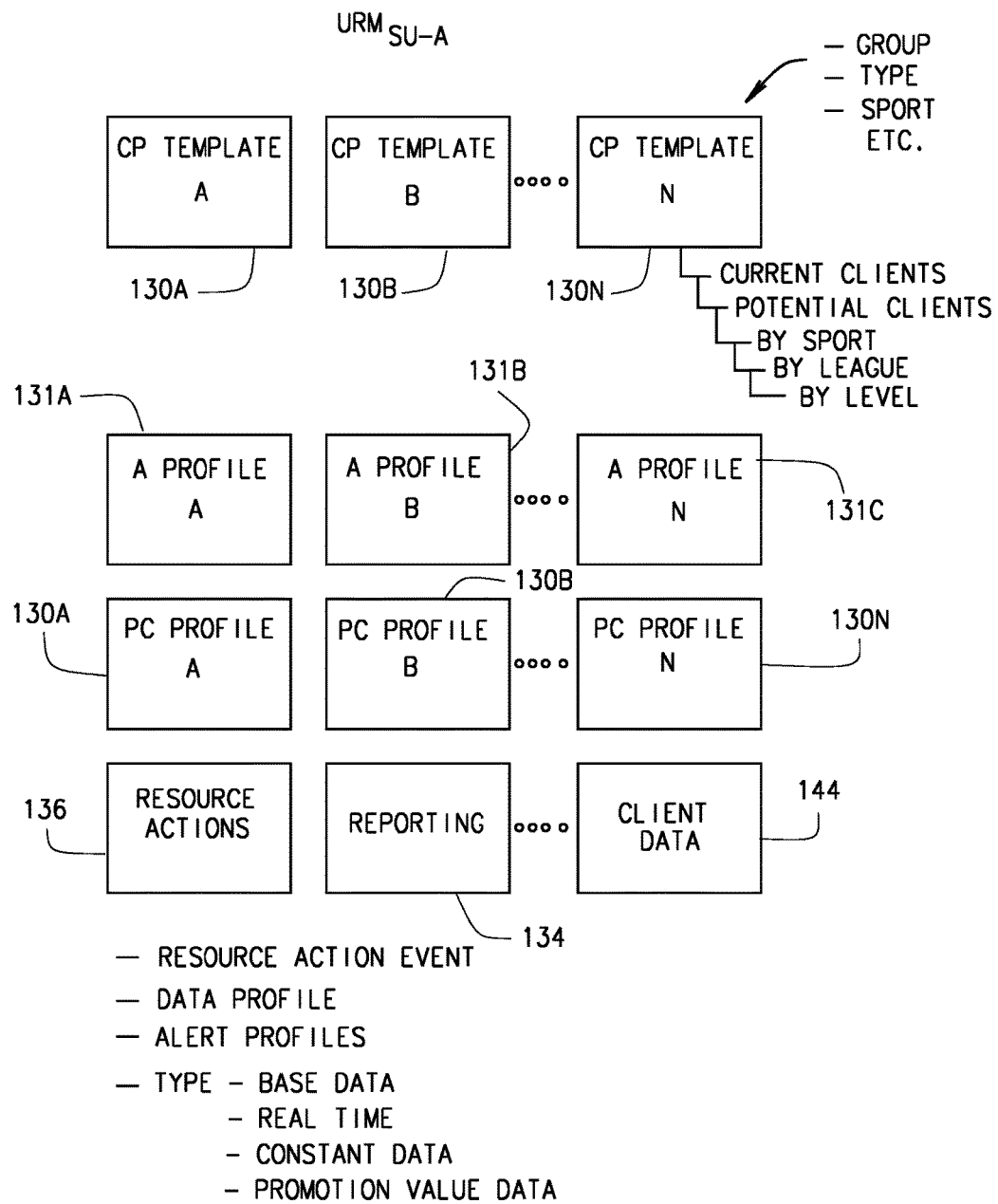
FIG. 10 is a block diagram listing of the various player-client subprofiles or data fields within a player-client profile according to one embodiment.
Figures 11, 12:
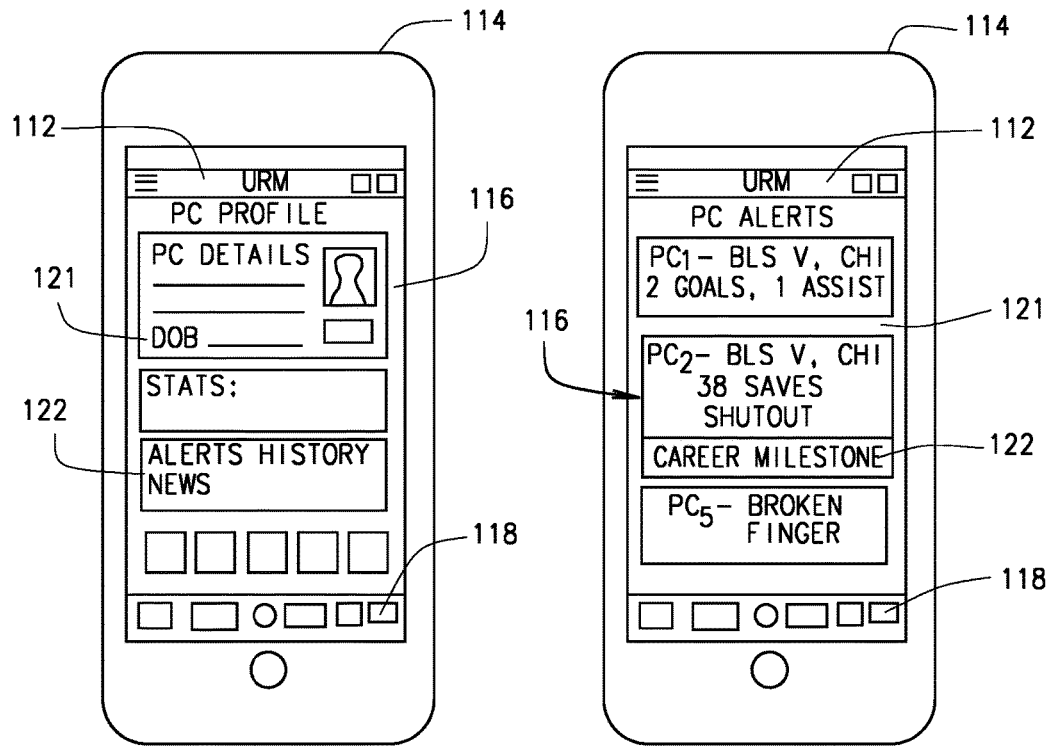
FIG. 11 is a front view a URM GUI screen presentation illustrating a player-client profile a screen for a mobile application implementation of the URM after being initiated or built by the system user according to one exemplary embodiment.
FIG. 12 is a front view a URM GUI screen presentation illustrating an URM player-client alerts screen for a mobile application implementation of the URM according to one exemplary embodiment.
Figure 13:
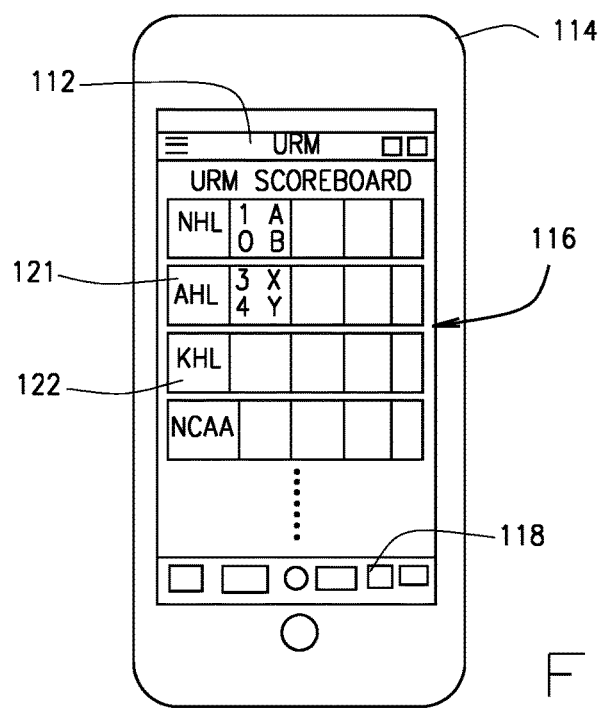
FIG. 13 is a front view a URM GUI screen presentation illustrating an URM My Scoreboard screen for a mobile application implementation of the URM according to one exemplary embodiment.

FIG. 300 is a flow chart of one process flow for a system user 102 for updating or adding player-client data 144 starting at selecting player-client in process 302, building a player-client profile 130 with player-client parameters 132 in process 304, and defining and selecting player-client content services 119 and CRS 141 in process 306. The process 200 further can include defining reporting parameters 134 in process 308, and defining the action triggers 136 for a player-client 104, and resource action events 146 in process 310. The system user 102 can also include in this process 300 the defining alert actions 148 in process 312 and saving one or all of these in the player-client profile 142 in process 314. The system 100 then using the URM 112 to upload the player-client profiles 142 and other input and received parameters of processes 304-312 to the system 100 and in most embodiments to the CRS 141 or other supporting centralized server as in process 316. The URM 114 can also receive instant player-client data 144 and update the player-client profile 142 in process 318. Each of these process steps can be performed in any order and repeated or skipped in various embodiments. FIG. 10 provides a high-level overview of the player-client templates 130A, 130B, and 130N, the agent or user profiles or templates 131A, 131B, and 131C, as the system 100 can support multiple agents or system users 102, each of which have their own and separate set of player-clients 104, each of which has one or more player-client profiles 130A, 130B and 130C, and each of which has one or more different resource actions 136, reporting parameters 134 and various other client data 144.

Glossary of Terms

System user 102—an authorized and registered user of the CRS 141 and URM 112. The System user 102 has an account with the CRS 141 and utilizes a proprietary URM 112. The system user 102 is usually a person, but could be one or more persons working together in some embodiments. Each system user 102 has a unique system user ID for system user 102 defined services and functionality with the CRS 141 and URM 112 and between such entities.

Player-client 104—A player-client 104 is a customer or client or perspective client of the system user 102. The use of the term "client" herein is not to be otherwise interpreted as a "client" as used in client-server systems or architectures (not to be interpreted as "a piece of computer hardware or software that accesses a service made available by a server", unless specifically and definitively identified as a client device for accessing a server. The system user 102 defines or selects one or more specific individuals as player-clients 104 from among a plurality of potentially available persons such as players in a sport. As described herein a player-client 104 is a person entity that has been selected by the System user 102 and is associated with the system user 102. A particular player-client 104 may be a player-client 104 of more than one system user 102. Each player-client 104 has a unique client ID for separately identifying the player-client 104 within and between the remote device 140 CRS 141 and computing system URM 112 of the system user 102 identifying or selecting such player-client 104. Further, at least the remote device 140 CRS 141 (and possibly defined by the URM 112 player-client profile 130 for each player-client 104) will typically have both the player-client ID as well as other player-client identifiers for identifying, pulling/requesting or analyzing performance data and associating such with the particular player-client ID for providing to a system user 102 URM 112 instances of player-client event data and instances of other player-client reporting data as well as support services for other URM 112 services and functionality as disclosed herein.

Each player-client profile 130 can be defined or specified by the system user 102 or based on predefined forms or templates 131, such as for a particular sport or for use by a particular system user 102. The player-client profile 130 can include player-client characteristics that are static as well as player-client reporting data or instant player-client data 144 as updated during operation of the system 100 as described herein. The player-client profile 130 can in the player-client reporting profiles 142 with one or more player-client reporting parameters 134 that are defined to pull or subscribe player-client data 144 such as instant player-client data 144 for reporting to the URM 112 as well as for updating the player-client profile 130 either on demand or in near-time to such data being available from a content service 119. The player-client profile 130 can include predefined player-client action triggers 136 related to one or more of the player-client reporting parameter 134. Further, the player-client profile 130 can include, in some embodiments, an alert action 148.

Player-client profile 130 example:
Player-client identifier.
Player-client name.
Player-client characteristics.
Player-client reporting parameters 134.
Player-client reported data (predefined, received and instant).
Player-client action triggers 136 (flags, metrics, thresholds, values such as to for one or more reporting parameters and associated with one or more player-client alert actions 148 and that can be associated with one or more player-client alert messages.
Player-client alert actions 148 such as an alert, a prompt, an automated message, or other action.
Player-client alert prompts or messages.
Player-client Concierge Resource—a concierge resource can include a list of restaurants desired by the player-client 104 for a meeting.
Player-client Sponsorship or Promotion Resource—the sponsorship or contract or promotions can include various data and parameters associated with the player-client 104 relations with third parties such as teams and sponsors.
Player-client Compensation Resource—this can include performance parameters within a contract that the player-client 104 has with a third party 154 such as a team.
Player-client reporting and or reporting trigger data. Player-client data 144 can include data such as performance or achievement events or actions as taken or associated with the client during an event, such as a sporting event. The specifics of the data varies based on the sport or event in which the client is participating and or metrics for the team of the player-client 104 or the player-client 104 as typically used or as defined by the system user 102 for evaluating the performance of the player-client 104. For example, for an ice hockey game in which the client is an ice hockey defensemen, the player-client event data could include, blocked shots, shots on goal, assists, goals, minutes played, penalty minutes, etc. As one skilled in the art of a particular sport or activity will understand upon reviewing this disclosure, player-client event data can be any data for a client in an event and can be adapted easily without undue experimentation. Player-client event data can be defined by the system user 102 for a particular client, but is generally defined by that data that is available from data services that track, determine and provide reporting of such player client and team data, a content service 119 provider. The system user 102 typically will select a subset of available event data and customize the client event data for the particular player-client 104 based on experience or methods or algorithms that the sport or the system user 102 deems appropriate for the client, event and sport.

The system user computing device 114 includes a user resource manager URM 112 that provides functionality to the user computing device 114 and specialized services to the system user 102 via a single enhanced user interface 118 with single source integrated functionality. One service and functionality of the URM 112 is to provide the system user 102 with a plurality of various displays or screens, each of which includes one or more icons, windows and content presentation such as text and data. The URM 112 alone and with integrated support from the CRS 141 provides the user computing device 114 of the system user 102 with enhanced operational functionality and integration with third party devices 152, third party applications and third party data. With integrated and automated communications within the URM 112, the URM 112 provides a unique self-contained user experience to the system user 102 for the features and functions of the system 100 as described in the various embodiments of the system and method.

The URM 112 can be in one embodiment a mobile application or "app" that is compiled software created for a particular use or added functionality over the native operating system of a mobile device which is the software that uses the programming language of a specific computing platform and is typically limited to that platform unless portable to others on top of the native firmware of the user computing device 114.

The URM 112 is configured to include application programming interface or SKD interface with co-resident application on the same user computing device 114. This can include a web browser for accessing and displaying web content. An SDK is one example of a self-contained library or framework enabling the extension of functionality of a third party library into and with the URM 112 as described herein. For native applications, the SDK can be defined by the native SDK tied to the native operation system such as Android SDK, i-Phone™ SDK, by ways of example. Other co-resident applications can also have their own SDK. For example, the URM 112 includes an interface to a co-resident Facebook™ SDK to enable the URM 112 to integrate features of the co-resident Facebook application on the user computing device 114 within the URM 112 or CRS 141 and therefore the system user 102 having to exit the URM 112 system and application. The URM 112 can have an SDK or API 164 profile interface for each co-resident application as described herein for integration as such provides the integrated development environment (IDE) plugins into such third party application for a seamless system user 102 experience of the URM 112 and system and methods described herein. Additionally from the other perspective, the URM 112 can include an API 164 or an SDK that enable other co-resident applications to utilize some of the features of the URM 112.

The URM 112 can be implemented in some embodiments as a hybrid application that is software that combines a native application with a web application to provide the ability to utilize native device functionality of the device such as the camera, GPS, communication interfaces 110 such as Bluetooth™, an accelerometer, that are distributed native applications, but the URM 112 is essentially a thin client or web apps with a native outer shell or wrapper.

The user computing devices 114 typically include a user device display 116 such as a screen that provided a displaying of URM 112 content presented by the URM 112. A graphical user interface GUI 121 is the screen presentation on a user device display 116 that includes menus including pull-down menus, pointers, icons, menus, windows, images, text and data. The GUI 121 typically uses screen presentations such as windows, icons, and banners in additional to images and text. As described herein an icon is a graphic indicator or symbol on a user device display 116 identifying and providing a visual link to a resource within the URM 112 such as a user resource, a third party application or program, a device or user computing device 114 feature, a command, file or directory or which when activated by the system user 102 opens the user resource in the user device display 116 displaying the details of the user resource thereon. The icons are generally analogous to buttons as they are configured for receiving a system user 102 selection referred generally as a "clicking" or "selecting" of the icon which result in the resource being "opened" as a window in the current user device display 116 or in a separate user device display 116 or can initiate an action or re-direction such as to a webpage by opening a co-resident web browser, another window or initiate another app or program or resource within the URM 112, such as an image, text, document or resource, along with a co-resident viewer app as associated with the format of the resource. This can include hot linking as well as hypertext links. Generally, an icon differs from a window as they lack most of the functions and components of windows, and therefore will be referred herein also as a button for clarity purposes.

For example, in one feature, the URM 112 provides for in-app "click to call wherein the URM 112 provides a GUI 121 window or icon that provides a hot link to a telephone number to automatically initiate a telephone call. As described herein, a prompt in the form of an icon or window can be presented in various GUI pages 122 of the URM 112 and the System user 102 can be presented with an option within the URM 112 to initiate a telephone call to the Client or a Third party 154 as defined by the GUI 121 by simply clicking the Click to Call Icon. The URM 112 establishes the communications without the System user 102 having to look up the telephone number or to exit the URM 112. Similarly, in some embodiments, the URM 112 can provide an in-app click to message resource. The click to Message resource is a similarly integrated communication feature of the URM 112 except is for sending a message such as a text message (SMS message) or a MMS message to the player-client 104 or Third party 154. Such third party 154 can be a manager or contact of a sports team, a sponsor or contact with a sponsor or promotions entity, a relative of the player-client 104 or another sports agent, by ways of example. This can include the capability to include an image, text or video file. In some embodiments of the click to message feature, the system user 102 can be presented with a preformed or suggested message that is predefined by the system user 102 or the system 100 based such as on a type of alert, prompt or the type of data associated with the portion of the URM GUI 121 with which the click to message icon is then currently associated. For instance, if a player-client alert is generated that identifies the player-client 104 as a hockey player that just completed game with 2 points, a predetermined message can be presented to the System user 102 that says "Congrats on the great game and 2 points—system user name." The system user 102 can set up the URM 112 so that this base message is presented to the system user 102, and enable the system user 102 to add additional message details, or simply send the message, by clicking the click to message button or the like such as "send." This can be similarly implemented as a click to email recourse wherein similar to click to message for initiates an electronic mail communication similar therein but in a different format and communications channel.

As one embodiment of a click to message feature utilizing multimedia messaging service would be a texting service between the system user 102 and a player-client 104 or a third party 154 which includes video, audio or graphic data as well as text data. MMS is an evolution of the SMS which is short messaging service (SMS) or similar texting services within or in support of various apps such as Instagram and Messenger services. For example, the player-client 104 or a third party 154 can send the system user 102 a video that is detected and automatically uploaded and stored in the player-client profile 130. Further the system user 102 of the URM 112 can include a most recently received or tagged player-client video in an initiated communication to a third party 154 or back to the player-client 104 that includes the video of the player-client 104 with a description or time stamp or the like.

Another communication resource would be an automated linking to the web resource via an URM 112 icon or URM 112 window. This URM 112 resource would enable the system user 102 to consolidate and integrate desired internet resources within the URM 112 for automating data review, compilations, blogging, updating and posting to social media or the like and other resource management action triggers, such an automating and in some instances prepopulating a communication to the client based on and/or including the linked reference or data.

A pull-down menu of the URM 112 is a form of an icon but wherein upon a system user 102 selection, a menu or listing of available resources or user resources within that icon are displayed enabling the system user 102 to select one from among the listing that is then opened. The GUI 121 includes windows that are graphically defined portions of the GUI 121 or user device display 116 that presents content such as resource content such as a directory, text, data or an image, that is unique and separate from other portions of the user device display 116. Often a user device display 116 includes multiple windows as well as icons. Similar to an icon, each window can be configured for receiving a system user 102 selection by a clicking which result in the window being "opened" either as a separate window in the current user device display 116 or with the window being the full user device display 116. Child windows are subsidiary windows that either open automatically or as a result of system user 102 activity within the parent window. Message windows often referred to as a dialog box or pop-up message are a special type of child window as they display information to the system user 102 but generally lack other functionality, except possibly to include an active link to a system resource enabling the system user 102 to select such active link to directly proceed to such identified system resource. On example is a banner alert message.

The URM 112 can also incorporate a badge to provide a visual notification bubble such generated by an alert as will be described herein.

The GUI 121 typically includes one or more defined metaphors for receiving user control and input such as by tapping playback controls, dragging, flicking or swiping objects, sliding on/off switches, and flicking through pages or photos, by ways of example. The GUI 121 can also provide a notification via an in-app message that originates from inside the URM 112 through means other than push notifications. An in-app URM 112 communication as described herein is a communication within the URM 112 such as initiated that provides an in-app voice telephone connection, email connection, text message, chat room, or a social media interaction performed within the user resource manager (URM) 112.

As known, computing devices 114 can also include global positioning system (GPS) capability for receiving satellite system data that provides geographic location data via integrated GPS receivers. The GPS signals originate from a plurality of the satellites enable the GPS receivers to provide the current geodetic location (geo location) including the altitude as location data for use by the URM 112 as well as other third party apps.

The URM 112 analytics provide for in app tracking of actions of URM 112 system users 102 to enable the GUI 121 to support the system user 102 between the various URM 112 resources and screens and menus.

As addressed above, the URM 112 and/or CRM can enable certain services for the URM 112 to be on behalf of the player-client 104. The URM 112 can provide the system user 102 the ability to act on behalf of or to represent the player-client 104 or to have access to one or more proprietary player-client systems such as social networking, financial or other system or service. In such cases, in order for the system user 102 to have authorized access, the player-client 104 has to "opt in" to the URM 112 based service or account access either by providing the system user 102 with the access information or via a URM 112 resource opts in authorization message and response. The player-client 104 of a system user 102 can opt in to enable the system user 102 such as his agent to collect personal data from the device or applications of the player-client 104. The player-client 104 allows and enables the system 100 to provide the system user 102 with access to the one or more of the player-client's 104 various social media, webpage, or communications services. The system 100 interfaces to player-client services for pulling updates and data from those services, and can enable the system user 102 to act as the player-client's 104 proxy for the player-client 104 on such service. The system user 102 can provide the system 100 and the system user 102 access to the player-client's social network service (SNS) account. The system user 102 can obtain direct data feeds from the player-client's SNS and can enable the system user 102 to act or post on behalf of the player-client 104. In this manner, the System user 102 can act as the public relations spokesperson for the Client. In other instances, this can more simply be just a data feed, or can be an account access, such as access to the player-client's financial account. Generally as described herein, the player-client 104 "opts in" to this optional personal data feed or service by allowing access from the system 100 and in particular the particular System user 102 of the system, all of which is provided securely by the system 100 as an interfacing and servicing system.

System User Access to the CRM and the URM—one Exemplary Embodiment

Use of the system 100 by a system user 102 can be provided as follows.

The system user 102 is provided a subscription access and authorized download capability to the Centralized Resource Manager CRM 112 for establishing an account and downloading the user resource manager 112 application to one or more user computing devices 114 of the system user 102.

The system user 102 can define or otherwise specify a system user account and account profile with the CRM that includes a definition of one or more features and function of the system users URM 112. The system users account and provide are customized to the particular system user 102 and are secure to that system user 102 and their URM 112 access and functionality.

First Time System Users of the URM i. As a system user visits each type of URM page that can include a tip briefly explaining the function of the URM page.

ii. The system user 102 can be prompted to accept rules of use of the CRM and URM 112.

iii. System user 102 can be prompted to select one or more sport from pre-populated list for which predefined System User Templates 129 and player-client templates 131 and features and functions are customized or customizable in view of the particular sport to which the system user 102 may be a player-client agent.

iv. System user 102 can select (such as from given suggestions) one or more player-client profiles 130 to which the system user 102 wishes to utilize for one or more player-clients 104, for example: current professional client, potential professional client, future prospect in minors, former client, by way of examples.

v. System user 102 can search a plurality of player-clients 104 by search a database 192 or memory or content server that is accessible through the URM 112 via an integrated web browser or via a search engine portal of the URM 112 or via the CRM having web access or access via one or more content servers for all possible persons who are potential player-clients 104.

vi. System user 102 selects one of the searched or input player-clients 104 from among the universe of possible persons.

vii. System user 102 assigned a player-user profile template 131 to the selected player-user, and can initial a player-user profile automated load wherein the URM 112 requests base data from the CRM to populate currently known and updated player-client data 144 into at least a portion of the profile for the selected player-user.

viii. System user 102 further can enter via the URM 112 further system user 102 defined or input player-client data 144 into each player-client profile 130. This can include system user 102 notes or developed data that is specific to the system user 102 or to the player client, to the sport, the team, the contract terms, or as otherwise will be described herein (see discussion throughout).

iv. The system user 102 can input or provide communications addresses or initiate access to co-resident contact applications data stored on the system user computing device 114.

x. The system user 102 can further initiate a request for an automated player-client opt-in as will be described which if approved by the player-client 104 enables the system user 102 to perform certain functions or actions or have access to player-client applications or services as will be described.

Any system user 102 can create a player-client profile 130 for a particular person, however, the system 100 can restrict access to certain private (non-public) portions of the player-client profile 130 fields unless the selected particular player-client 104 opts in or otherwise provides their acceptance or consent to the particular system user 102 for such access. For example, this could include player-client contract terms with a team or with a promotion entity.

Player-client profile 130 creation and initial player-client profile 130 data population should utilize an intuitive workflow, including duplicate checking and suggested matches or automated downloads, or providing the system user 102 with an option to pull or collect player-client data 144 from a particular content server or source.

Once created in the URM 112, each player-client profile 130 can be uploaded or synched with the CRM in whole or in part. In some cases, the system user 102 will not want to upload certain proprietary portions of the player-client profile 130 and the URM 112 or the player-client profile 130 can be configured to only back-up or share a portion of the player-client profile 130 with the CRM. In some exemplary embodiment, the URM 112 only transmits player-client reporting parameters 134 to the CRM as will be described thereby providing the CRM the ability to collect player-client event data from one or more content servers. The CRM can then transmit to the URM 112 such instant player-client event data when such is received which could be in near real time to such receipt.

System User Player-Client Use Operations—My Player-Clients

Searching should preferably be available on all appropriate screens and present or allow a search entry when accessed.

All identified player-client profiles 130 will be available in the "My Player-Client" displayed screen or section of the URM 112.

Search results are categorized and sorted by way of example:
 i. By most current alerts.
 ii. By predefined priority.
 iii. By Last Name and Team Name.
Player-client Metrics
 i. Player-clients 104 may be rated by a performance score, an activity score, an event or milestone score, a social score, etc.
 ii. A player-client 104 may also have a trending score represented by an up or down arrow based the most current player-client reported event data or other defined parameters.
 iii. These scores may appear on the My Player-Client screen, within the player-client profile page or in the Player-Client Alerts screen.
Player-Client Alerts
Content services 119 Fees
A player-client content service feed can include a social networking or newsfeed.

Thresholds or action triggers can be developed for each, such as the number of tweets received by the player-client 104 or the number of profile views or likes.
URM Exemplary Graphic User Interface (GUI) pages for displaying content, obtaining system user 102 input via instructions and system user 102 content, etc. Example with a Player Agent being the system user 102.

System user login—login with system user ID, password, and Remember Me option.

Referring to the figures, one example of a Main Page of the URM 112—Tabs or Icons for Client Alerts, Clients, Potential Clients, Teams, Leagues, and of course one for Settings. As noted above, the URM 112 is generally composed of a plurality of resource modules 120, some of these resource modules 120 may correlate to each of the Main Page Listed Features, however some of the resource modules 120 are underlying functional modules providing support for two or more Main Page Listed Features.

Player client alerts—As the URM 112 is a real time or near real time system 100, the URM 112 includes both in app pushed notifications as well as received pushed notifications as received or determined by the CRS 141 that hosts some or portions of the system 100 and method functionality. This resource module 120 provides the System user 102 the ability to readily identify via the Main Page whether there are currently any client alerts that may warrant the attention or action by the System user 102. Further, the resource module 120 can be selected by the System user 102 to provide alerting and displaying in near real time of Client Alerts via a badge display on the User Device or possibly via generation of an email or a text message to the System user 102. It is also possible that email mail message or text messages can be automatically sent to third party 154 addresses and devices as will be addressed as an option under the Client Alert RM Settings.

Once the System user 102 opens the Client Alerts RM via activating the Icon or tab, the Client Alerts RM screen provides a listing or other display of all current alerts. Each Client Alert listing can include the name of the Client and the basis for the Client Alert. For example, Alert Characteristic could be the Client scored a goal in a hockey game or achieved 2 or more points in a game. In such an example, the Client Alert would list the name of the Client, and "1 goal and 2 assists." Additional information can also be provided, either directly on that user device display 116, or by opening the particular Client Alert to expand the details that may include an identification of the game, the opponent, the period, etc. The System user 102 defines for each Client the Client Alert Parameters that trigger the generation of the Client Alert within the Client Alert RM.

The player-client alert RM can include a direct link to the player-client profile 130 via a separate tab. Further, the player-client alert RM can include one or more Action Icons prompting the System user 102 to directly initiate a communication, such as communication to the player-client 104 or to the third party 154, such as the manager of the team, the later for example, "Show us the money." These action icons can be enabled by a player-client action event or trigger and can include call, text, tweet, social networking post, or a concierge action. As described, some of these actions can include an automatic transmitting of a predefined message or posting, while in other cases, result in the Action Icon opening up within the URM 112 an in app SDK or activation of the third party app for enabling the System user 102 to automatically initiate a telephone call, a text, a Tweet, a FB Post or to make a concierge arrangement (as described herein).

Player clients—The player-client RM first provides a listing or icons or otherwise display for a plurality of player-clients 104 of the system user 102. A sorting, organizing or search function can be provided to aid in the review and selection of a particular player-client 104 from among the plurality of player-clients 104 as defined or selected by each system user 102. These can be organized by league or in folders or simply provided by alphabet sorting, priority or most currently accessed. Each player-client RM can be organized to include player-client specific information and data. The inclusion of the data and information can be defined by the system user 102 but can include a player-client profile 130 page and subpages for client data by type, date, etc.

Settings—Like most Settings functions, the Settings function is a user interface 118 enabling the System user 102 to define the optional features and to customize the URM 112 as well as the CRS 141 and CRS Services supporting the User's URM 112. As described in various portions of this disclosure, that can include selecting or defining any set of feature, clients, client characteristic or parameter, and controlling generalized alerts, prompts, communications or other actions or trigger thereof. Specialized configurations or settings of per-Client features are generally set or defined in the Client Profile portion of the Client section of the URM 112.

Note—one or more of the described GUI pages/screens 122 should include a Back Button, or Home Button, or a button for linking to another portion of the Device Manager. In an alternative embodiment, each of the main page tabs can be permanently displayed along the top or bottom ribbons of some or all of the subordinate screen pages for ease of jumping from one MOD to another without having to resort to the Main Menu.

During operation, the remote system 200 utilizes all or a subset of the client profile data received from the CRM as client data monitoring profile that identifies for each client the client reporting data such as client event performance data or client new data or the like. The remote system 200 obtains from one or more content servers client content data via a per-client pull client data request that is specific to the client and to the client reporting data, from a push service content server that is either on a per client basis, a per event basis, per team basis or per league basis. When the remote system 200 received bulk data, the remote system 200 utilizes the client reporting data profile and parameters with the bulk data to extract or uniquely identify the client reporting data. Once identified and extracted, the remote system 200 stores the client reporting data in the client and possibly the user stores therein and pursuant to the system user client reporting event parameters, transmits the client event data or other client reporting data to the CRM of the user computing device 114. The CRM receives the client reporting data and stores the data in the client profile or history for the client. The CRM then utilizes the received client reporting data as will otherwise be described herein.

As defined herein, player-client data 144 or parameters can include one or more metric that is the measurement of a particular characteristic of one or more of the activities of the player-client 104 or processes defined herein. As used herein, a metric is sometimes used directly and sometimes as an element in one of the described process flows (algorithms).

Content Services

Content services 119 and third party service databases 192 as described herein can include, but are not limited to the following:

Team and Player Service Databases—By way of example, for the NFL, NHL, etc. For hockey for example, depending on the scope of the system user 102 designations, this could include not only the NHL, but also other leagues and payers in those leagues, such as, by way of example and not intending to be limited to: Hockey leagues such as AHL, ECHL, KHL, OHL, WHL, QMJHL, AIHL, NCAA (Div 1), etc.

Content Data Services Can Include by way of example:
Play by Play in close to real time: play by play for a single game currently in progress with update feeds in near real time e.g., within seconds, not minutes.
Player logistics: provides game by game statistics for each player but may only be updated once a day.
Box Scores—game data detailed enough to enable the complete box score build for every game updated in 20 seconds (near real time).
Player Stats per day; Team Stats per day; Weekly leaders; Injury Report (with Details and histories); Leaders for season; statistics for all players year by year; game by game statistics; team transaction details such as trades and contracts.
News feeds—complete or snippets about each player, league, or team when entered, monitored and identified on a new feed or new source.
These services are often provided between from the third party data service as an FTP push based on a prescription, an FTP pull whereby the service can pull only the required data, or on an HTTP download.

These will be explained within the operation and functionality of the centralized resource enabler system CRS 141.

Exemplary Embodiment of Use and Operation

We now have a way that will allow agents to not only know exactly what his clients did the night before in the game, but it will give them real time information organized in a way that frees up time for them to be spent on revenue generating activities. With the Omnipresent agent mobile website/app each agent will now have the ability to not only know what his players are doing live, but give you the ability to communicate with them so they know you not only care for their career, but more importantly you know how to get them the most in the next contract they are looking for. This will revolutionize how agents interact with clients and the knowledge they will have about who the best in each sport or industry may be.

For example, if the system user 102 is an agent or sports agency and I have 104 clients. The system user 102 will initially load each client into a secure website that will have a log in and password. Once the client-players 2014 are loaded, the system user 102 can set his preferences, what to keep track of or what information do and what the he system user will track. Examples could be goals, assists, and total points. It can go further than that, with ability to track social media or news headlines. After the preferences are set, you can now connect through your mobile device. You will also be able to set preferences for alerts, so when any of your players on the list hit one of your criteria, goal, assist, or status update on Twitter™, you get an alert and you can explore this. As you log in, the players with the highest totals the alerts will be at the top of the list. This gives you the ability to see player-clients that are having great games or are for some reason speaking out in social media. From this area you will save additional time because you have the ability to click on each player and communicate with them in a variety of ways. Call, text, email, Facebook™, Twitter™ will all be available as tools to communicate. The other feature available is a concierge button. This will be useful when career milestones or great games or efforts are had by the player. You can now use the concierge button to call a service that will set up reservations at a restaurant or club and allow you to pay for it and have it set up for the player. You will have it ready for them by the time they are done with postgame press interviews. Now you will not only be on top of the stats and news for you players in real time, but you eliminate time spent in your morning or evening trying to track everything. You become more efficient with your time while remaining in close communication with your clients strengthening the relationship you are building. These are only two benefits because this data will be collected and stored in a way that will allow you to use this as leverage for contract years. We can load in data that will allow you to look at current contract details having it at your fingertips in case a call comes from an owner or a sponsor.

You also can start to track players you want to become clients. By creating tracking categories that give you the data you want for players you want. This is just another tool that will save you time and money. Another huge application is the market of sponsorship. From a corporate level, sponsorship is at an all-time high, it is a billion dollar market. As quickly as celebrities get sponsorships they also create problems for the sponsors and decisions must be made on a corporate level on how much they want to protect the brand that is more important than the player/client. If the Corporate sponsors such as Nike, Coca Cola, Pepsi, Reebok want to get the most out of the sponsorship they must have accurate time sensitive data. With this mobile website/app they will be able to track whomever they would like and also track a player-client 104 whom may be trending up in social media to capture the next big sponsor star. This could replace the time it may take 3 or 4 employees or maybe an entire research department whose job may be to track who are the best candidates. The other level this will be useful is at the team level. In this day and age information is in the hands of the public before the instant data is in the hands of the General Managers, and owners and even coaches. The want to track what your players or potential prospects are doing in the off-season or if they are out on the town during the season, this could be a great solution. Players may not like it but some may say that's the price you pay to be an athlete. With Millions of dollars at stake, protection of investment dollars has more need now than ever. Most times negative news about players is a distraction to a team and can cause issues that will have a ripple effect in the locker room or clubhouse.

One form of a player-client parameter 132, player-client reporting parameter 134, an instant player-client data 144 and also a player-client action trigger 136 is a known social value as reflected by the industry from time to time for such value determination. This can include hits on a webpage, blog article mentions, friend, followers, tweets and the like. One example of a currently used social value parameter data is a social networking influence score in one exemplary embodiment that is a Klout™ score, of course other social networking scoring is also possible. In the example of using the Klout Score, the system user 102 can define a Klout score trigger value for each player-client 104 in the player-client profile 142 and can define the trigger action that the URM 112 and/or CRS 141 should take in response to receiving an updated Klout score from a Klout score content server. The Klout score is a compilation across multiple networks based on the Klout defined signals and its defined algorithms and service and that is updated daily based on various player-client social networking actions or third party social networking actions related to the player client. Of course the CRS 141 can obtain direct feeds from one or more social networks 158 or new sources and can develop a social networking score other than an influence score based on its own defined set of parameters and actions that may be particular to the value or perceived value of the player-client 104 within the particular sport, with regard to a particular team, a contract or an existing or proposed endorsement contract or terms, as may be more suitable to a system user 102 than a generic influence score such as a Klout score.

In such embodiments the resource action event 146 can include a comparison to a contract of the player-client 104 such as, by way of example, with a sponsor or a team that includes a remuneration or recognition for achieving such network influencing score threshold or trigger value.

As shown in the figures, the URM 112 can be implemented with various components 150 including, but not limited to: a communications manager; a synchronization manager; a synchronization manager; a local memory/storage manager; a remote data access manager; a data optimizer; a security manager; a device manager; an application activity triggered synchronization manager; a URM 112 business application having URM 112 business logic, validations and alerts, and user interface 118; an external resource manager 113 and interface and a device resource manager 112, by ways of example, and not being limited thereto.

In a similar manner, the CRM can be implemented to include a URM 112 download and update communication manager; a URM 112 activity manager; an authentication manager; a device output manager; a content services manager; a CRM business manager; a storage/memory manager; an administrative console; a database manager; a content services subscription manager; a content services pull-data manager; a URM 112 synchronization manager; a security manager; an enterprise manager; and one or more backend APIs 164, by way of example.

Implementation and Operational Environment for the URM and CRM

FIGS. 14-18 shows an exemplary embodiment of an implementation of the system 100 and method, generally referred to as a computer system 200, which includes at least one user computing device 114 operatively connected to at least one remote device 140 such as a host server 160 through a communication network 126 to communicate data between the user computing device 114 and the remote device host server 160. The system 100 and method which have been described above in detail can be implemented on computer system 200.

Figure 14:
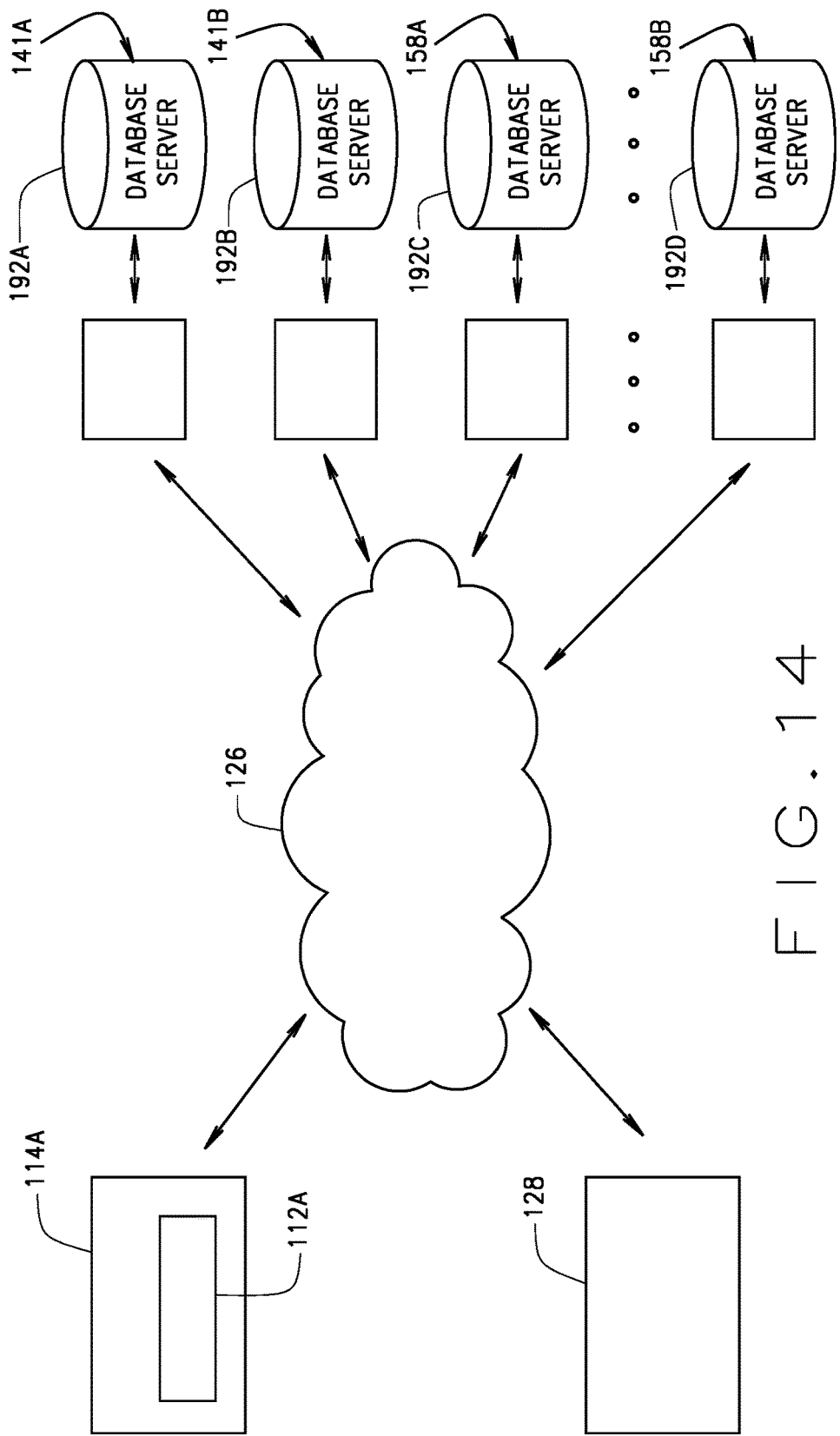
FIG. 14 is a schematic block diagram illustrating one exemplary computer and telecommunications network environment suitable for use with the current disclosure according to some exemplary embodiments.

In an embodiment of FIG. 14, the embodiments of the user computing device 114 include any electrical or electronic device capable of communicating with a remote device host server 160 through a communication network 126, such as, for example, a cellular phone such as discussed above, a personal digital assistant (PDA), a telephone operating with an interactive voice-system, or a television operating with a cable or satellite television interactive system. The user computing device 114 can also be a computer 200, including a processor, memory 192 that may include transitory or nontransitory memory, a mass storage device, a display device 114, 128, 152, and an input device 170, such as a keyboard, that is capable of running a network interfacing program 172, such as web browser software available, for example, Chrome from Google® Corporation, Safari from Apple® Corporation, or Internet Explorer from Microsoft® Corporation, or an appropriate custom software application which implements at least some of the system 100 and method described above. The user computing device 114 can be appropriately equipped with a network interfacing device 114, 128, 140 for communicating data with the communication network 126, such as a an interface to a cellular or mobile wireless network, dial-up modem, a cable modem, a satellite connection, a DSL (Digital Subscriber Line) connection, a LAN (Local Area Network), or the like.

As noted, the user computing device 114 includes an operating system configured to perform executable instructions. The operating system can include software, including programs and data, which manages the device's hardware and provides services for execution of software applications/modules. Those of skill in the art will recognize that suitable operating systems can include, by way of non-limiting examples, Apple OS, Microsoft Windows, Microsoft®, Windows®, Apple® Mac OS X®, UNIX®, and UNIX-like operating systems such as GNU/Linux®. In some embodiments, the operating system can be provided by cloud computing. Those of skill in the art will also recognize that suitable mobile smart phone operating systems include, by way of non-limiting examples, Nokia® Symbian®, OS, Apple® iOS®, Research In Motion® BlackBerry OS®, Google® Android®, Microsoft® Windows Phone®, OS, Microsoft® Windows Mobile®, OS, Linux®, and Palm® WebOS®.

As noted, the user computing device 114 typically includes one or more memory device or storage devices that can include one or more transitory or nontransitory memory devices. The memory can store data including operating system, programs, applications, system user data, and application data on a temporary or permanent basis. In some embodiments, the memory can be volatile and requires power to maintain stored information but can also be nonvolatile and retains stored information when the user computing device 114 is not powered. Further, the memory can be located with the user computing device 114 or can be attachable thereto either physically or via a data network connection to a remote memory.

The user computing device 114 can include a visual display as the user device display 116. In some embodiments, the display can be a cathode ray tube (CRT) or an optical projector, but is increasingly a flat screen such as a liquid crystal display (LCD), a plasma display, a thin film transistor liquid crystal display (TFT-LCD), a light emitting diode (LED) or an organic light emitting diode. In other embodiments, the display can also be a combination of devices such as those disclosed herein. Typically they are located proximate to the digital processing but in some embodiments, the display can be remotely located.

The user computing device 114 can also include one or more input devices or features. In some embodiments, the input device can be a keyboard or keypad but these can also include a pointing device such as, by way of non-limiting examples, a mouse, touchpad, light pen, pointing stick, trackball, track pad, joystick, game controller, stylus, touch screen, multi-touch screen, a microphone that captures voice or other sound inputs or an optical image capture device that can capture images or motion or other visual input. In still further embodiments, the input device can be a combination of devices such as those disclosed herein.

In accordance with the description provided herein, a suitable user computing device 114 can include, by way of example, server computers, desktop computers, laptop computers, notebook computers, tablet computers, mobile phones such as smart phones, audio devices, personal digital assistants, netbook computers, smart book computers, sub-notebook computers, ultra-mobile PCs, handheld computers, Internet appliances, and video game systems both portable and fixed.

A system user 102 interacts with the user computing device 114 by viewing data via the display device 114, 128, 152 and entering data via the input device 170, or other suitable input interface such as a mouse, microphone, touch screen, and the like.

Figure 15:
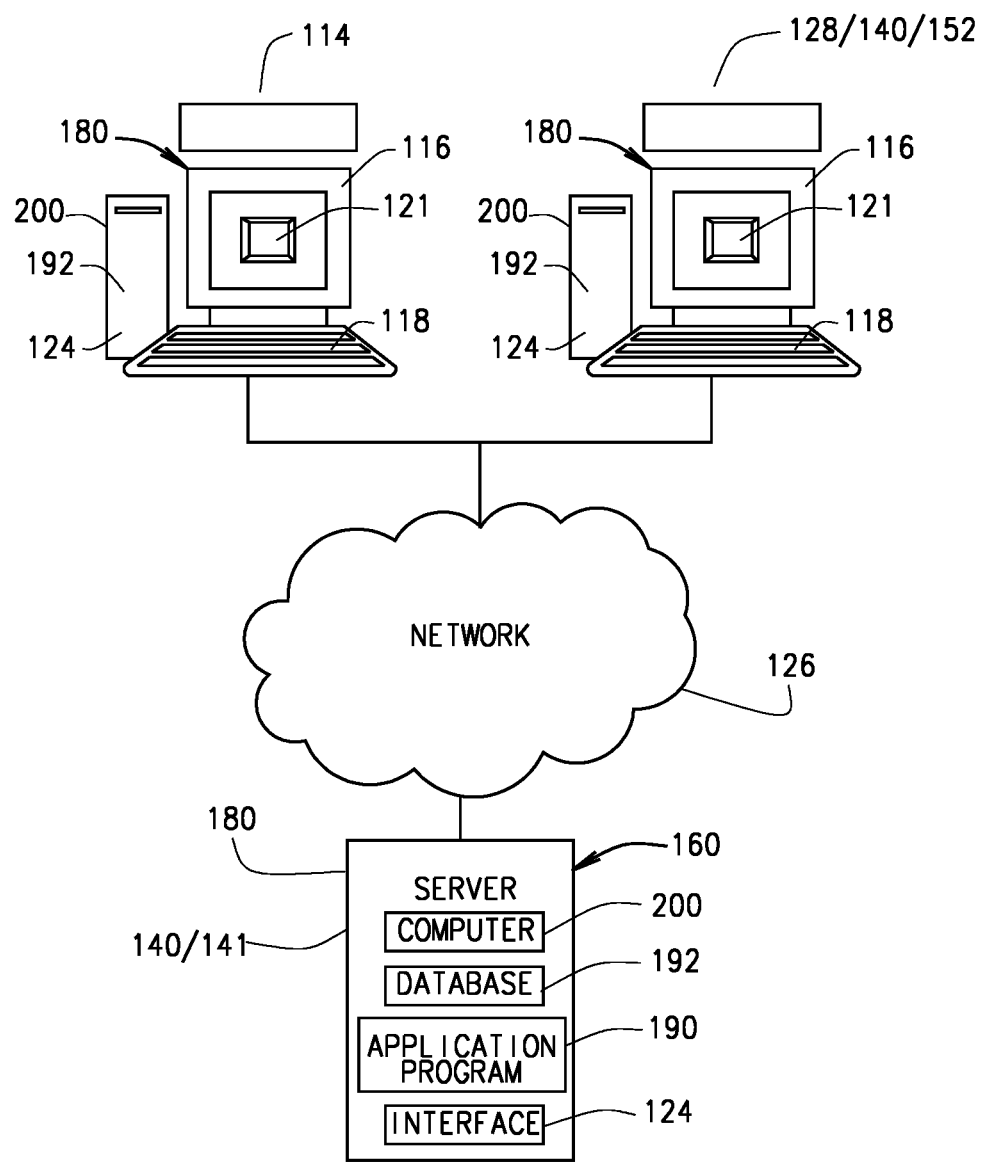
FIG. 15 is a schematic block diagram illustrating one exemplary computer operating environment communicating over a network suitable for use with the current disclosure according to some exemplary embodiments.

In an embodiment of FIGS. 14 and 15, the communication network 126 can be a cellular or mobile wireless network or a WiFi™ network. A non-inclusive list of exemplary wireless protocols and technologies used by communication network 126 includes BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), packet switched core networks (PS-CN), and near field communications (NFC).

A mobile application, or app, executed by user computing device 114 can communicate with a remote device host server 160 via an Application Programming Interface (API) 164, such as Parse (http://www.parse.com), using the communication network 126 using the Hypertext Transfer Protocol (HTTP). The API 164 can accept data from the user computing device 114 and send it to the remote device host server 160 which can process the information.

In an embodiment of FIGS. 14 and 15, the communication network 126 can be the Internet, which uses a suitable communications protocol, such as Hypertext Transfer Protocol (HTTP), to communicate data between the player-client devices 114, client devices 128 and third party devices 152, as well as content services servers such as servers and services such as content services 119, and social network services 158 and third party database services 192, by way of example, and the remote device host server 160. However, the communication network 126 can be any network that allows an exchange of data between the devices 114, 128, 152, as well as other possible communication devices, services and services, and the remote device host server 160, such as a LAN or WAN (Wide Area Network). In addition, any suitable type of communications protocol can be used, such as FTP (File Transfer Protocol), SNMP (Simple Network Management Protocol), TELNET (Telephone Network), and the like. An exemplary non-inclusive list of primarily wireline protocols and technologies used by communication network 126 includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

The network interfacing program 172 allows the system user 102 to enter addresses of specific web pages to be retrieved, which are referred to as Uniform Resource Locators, or URLs. The web pages can contain various types of content from plain textual information to more complex multimedia and interactive content, such as software programs, graphics, audio signals, videos, and so forth. A set of interconnected web pages, usually including a homepage, are managed on a server device as a collection collectively referred to as a website. The content and operation of such websites are managed by the server device, such as remote device host server 160, which can be operatively connected to the communication network 126.

The remote device host server 160 preferably comprises a computer system 180, having a processor, memory, and a mass storage device, which is capable of running the system 100 and methods application programs 190. A database 192 can be stored on the mass storage device. Also, the remote device host server 160 can be appropriately equipped with a network interfacing device 114, 128, 140 for communicating data with the communication network 126, such as a dial-up modem, a cable modem, a satellite connection, a DSL connection, a LAN, or the like. If necessary to accommodate large amounts of information or run numerous applications, alternate embodiments of the remote device host server 160 can comprise multiple computer systems, multiple databases 192, or any combination thereof.

The web server applications are software running on the remote device host server 160 that make it possible for the client browsers to download stored web pages. These applications also coordinate streaming audio, video, and secure e-commerce, and can be integrated with databases 192 (as described below) for information retrieval. Examples of web server applications that can be used with the present invention include: Apache™, Microsoft's Internet Information Server (IIS)™, O'Reilly & Associates WebSite Pro™, Netscape's FastTrack Server™, and StarNine's Web-STAR™ (for Macintosh), although any operating systems known or anticipated can be used.

In one or more embodiments, the application servers will insert strings of programming code into the formatting and display language, with client browsers employing interpreters (or a plug-ins) to translate back into the formatting and display language (for example, HTML) to display a page. Examples of application servers that can be used with the present invention include: Cactus™, Cold Fusion™, Cyberprise Server™, Ejipt™, Enterprise Application Server™, Netscape Application Server™, Oracle Application Server™, PowerTier for C++™, PowerTier for Enterprise Java Beans™, Secant Extreme™, Enterprise Server™, SilverStream™, WebEnterprise™, WebSpeed™, and WebSphere™ although any application servers known or anticipated can be used.

In some embodiments, the systems 100, 200, the platforms, the servers, the programs (computer executable instructions), and methods disclosed herein for the System 100 and method can include one or more computer readable media encoded with a program including instructions executable by the operating system of an optionally networked user computing device 114, wherein said instructions create a social shopping networking service. In further embodiments, a computer readable medium can be a tangible component 150 of a user computing device 114. In still further embodiments, a computer readable medium can be optionally removable from a user computing device 114. In some embodiments, a computer readable medium includes, by way of non-limiting examples, CD-ROMs, DVDs, flash memory devices, solid state memory, magnetic disk drives, magnetic tape drives, optical disk drives, cloud computing systems and services, and the like.

The database 192 can store Device Ids (for Anonymous Users), player-client profiles 130 and the other data as described herein. One skilled in the art will recognize that any particular piece of information can be stored in the database 192 located on the remote device host server 160 or the local database 192 located on the user computing device 114 without departing from the scope of the current disclosure.

In one or more embodiments, the DBMS can be an RDBMS that uses relational database 192 to retrieve information from the system 100 and method database 192. In one or more embodiments, the relational database 192 uses structured query language (SQL™), including SQL defined according to International Standards Organization (ISO) and American National Standards Institute (ANSI) standards, or follow these standards with additional language constructs. In one or more exemplary embodiments, an application on the remote device host server 160 can access database 192 via an application programming interface (API) 164, including for example the open database connectivity (ODBC™), Java database connectivity (JDBC™), APIs 164.

The previously described system 100 and method can be implemented as a series of interconnected web pages, or as a mobile app. As one skilled in the art will appreciate, the series of interconnected web pages or mobile app screens, portions thereof or data field or link contained therein, can be constructed from the information in the system 100 and method, as that information is described herein. The information can be used for simply display, can be shown as hyperlinks or other navigation controls, including but not limited to buttons, as is known in the art. The hyperlinks or other navigation controls can be used to link, provide data, or provide navigation between the individual pages or screens that make up the series of interconnected web pages or mobile app.

The manner of displaying the retrieved informational content in a web browser is primarily according to formatting and display languages. Examples of formatting and display languages that can be used with the present invention include Hyper Text Markup Language (HTML), eXtensible Markup Language (XML), eXtensible HyperText Markup Language (XHTML), and Cascading Style Sheets (CSS).

HTML can be used to create text files that contain markup tags, which inform the browser how to display the page. HTML files must have an "htm" or "html" file extension, and can be created using a simple text editor. XML can be a markup language that permits system users 102 to define their own markup tags. The markup tags in XML are not predefined as with HTML. XML uses a Document Type Definition (DTD) or an XML Schema to describe the data. While HTML was designed to display data, focusing on how the data appears, looks, XML was designed to describe data, focusing on the data itself, providing the ability to structure, store, and to send information. XML can be pared-down version of Standard Generalized Markup Language (SGML), specifically designed for Web documents. SGML can be a comprehensive system for the organization and tagging of document elements. Rather than specifying particular formatting, SGML specifies the rules for tagging elements. XHTML can be the same as a version of HTML referenced as HTML 4.01. It is HTML defined as an XML application and applies a strictly defined version of HTML. CSS can be used to design stylesheet pages, which define how the document is displayed or printed to the browser. CSS sheets can be attached to the HTML document itself. The cascading feature supported by CSS permits a single document to use two or more stylesheets, which are applied according to specified priorities.

The manner of formatting the information for retrieval from servers and transmitting the retrieved information over network are determined by protocols. A variety of protocols can be used to implement the present invention over the Internet, including the aforementioned HTTP, FTP, telnet, as well as, for example, Internet Relay Chat (IRC).

The main protocol (or set of rules for navigation and exchanging of files between clients and servers) used on the Web is HTTP, designed for exchanging files running on top of TCP/IP. HTTP not only defines how messages are formatted and transmitted, but also what actions Web server applications and browsers should take in response to various commands.

The act of using a client browser to download a Web page located at a server application can also be called navigating the Web, or browsing the Web, or linking to Web sites on the Web. Each Web page has a Web address called a Uniform Resource Locators (URLs). Consequently, Web pages are located by linking to the URL of a Web page and displaying it in the browser. System users 102 can link to Web pages by selecting or clicking on menu choices, highlighted words, or graphics associated with URLs. When a system user 102 enters a URL in his/her browser, or otherwise attempts to link to a website, it causes an HTTP command to be sent to the appropriate Web server, directing it to fetch and transmit the requested Web page.

If necessary to accommodate large amounts of information or run numerous applications, alternate embodiments of the remote device host server 160 can comprise multiple computer systems, multiple databases 192, or any combination thereof.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A system providing a system user integrated player-client management service with enhanced point-to-point communications between a system user and a player-client defined by the system user, the system comprising:

a user resource manager (URM) resident on a wireless mobile computing device of a system user having a display and a user interface and being composed of a plurality of resource modules providing a graphical interface in the form of URM pages displayed on the system user computing device display, the computing device having a wireless communications interface providing communications over a wireless communications network separately to a communication device of each player-client for which the system user has pre-selected, the URM including a plurality of player-client profiles with each player-client profile being for one of the player-clients previously selected by the system user and having one or more player-client parameters that includes one or more player-client reporting parameters and one or more player-client communication action triggers, the mobile computing device storing at least one action communication address for each player-client, the URM providing a plurality of player-client profile page displays as a part of the displayed URM pages, the URM transmitting to a remote device at least a portion of the player-client profile for each player-client as the player-client reporting profile including the one or more player-client reporting parameters, in response the URM receiving instant player-client data from the remote device and updating the player-client profile with the instant player-client data, the URM comparing the received instant player-client data with a player-client communication action trigger defined in the player-client profile for detecting in at least near real time an occurrence of a communication action event and, in response to such detecting, generating an alert action communication instruction to a communication component of the mobile computing device of the system user providing an indication on the mobile computing device that the resource action event was detected, in response, the communication component generating a communication prompt on the wireless mobile computing device notifying the system user that the occurrence detection was made and enabling the system user for automatically initiating a communication to the action communication address of the player-client.

2. The system of claim 1 wherein the alert action communication instruction includes the communication prompt being either a) in a one-step response action performed by the system user in response to the communication prompt, or b) automatically without requiring the system user to take any action, as predefined by the system user in a reporting communication action of the player-client profile for the client player communication action event.

3. The system of claim 2 wherein the communication action trigger includes a mobile computing device user notification either within the URM or external to the URM within the mobile computing device utilizing a co-resident user device notification feature such as an icon, a vibration, or a sound.

4. The system of claim 3 wherein the communication action prompt includes an icon or badge on the display of the mobile computing device and that includes a hotlink for automatically initiating the communication upon activation or selection by the system user.

5. The system of claim 2 wherein the alert action communication instruction includes the automated communication prompt on the URM display of the mobile computing device of the system user providing the system user with a window within the URM identifying the player-client and identifying the instant player-client data or the determined communication action event, and displaying an automated communication icon configured to initiate the communication to the action communication address of the player-client upon activation or selection by the system user of the automated communication prompt.

6. The system of claim 2 wherein the alert action communication instruction from the mobile computing device containing the URM to the action communication address of the player-client a communication selected from the group consisting of a text message, an Instagram, a chat, a multimedia message, an email message, a voice telephone call, a posting on a website and an entry or posting on a blog.

7. The system of claim 2 wherein the URM includes an application programming interface (API) integrating a co-resident communication application of the mobile computing device within the URM, the integrated co-resident communication application being initiated by the communication prompt of the alert action communication instruction and being selected from group of integrated co-resident communication applications on the mobile computing device consisting of: a text or multimedia message application, an email application, a voice telephone call application, a social networking application, a website application, and a content service application.

8. The system of claim 2 wherein the alert action communication instruction and the communication prompt are predefined and stored in the player-client profile by the system user for the player-client.

9. The system of claim 2 wherein the communication prompt includes the player-client action communication address as retrieved either from an external directory co-resident on the system user mobile computing device or as entered and stored in the player-client profile by the system user.

10. The system of claim 1 wherein the URM includes an application programming interface (API) for integrating or incorporating the functionality of a co-resident application or accessible application of the mobile computing device selected from the group consisting of: a calendar, a web browser, a contact list, a directory, a telephone application, a text or multimedia application, a memory, a camera or video capture application, and email application, and an alerting application.

11. The system of claim 1 wherein the system user is a sports agent and the player-client is an athlete who is a client or a prospective client (referred herein simply as a player-client) of the sports agent, and wherein the content server is a sport statistics data base server and the received instant player-client data is an athlete event criteria of the player-client during a sporting event in which the player-client is participating.

12. The system of claim 11 wherein the player-client reporting parameter, player-client reporting data and instant player-client data are selected from the group of athlete event criteria selected consisting of goal scored, assist, blocked shot, runs or points scored, distance gained, goal against, penalty, tackles, hits, sacks, etc.

13. The system of claim 12 wherein, for whatever athlete event criteria is selected, the player-client communication action trigger is a predefined quantity or threshold for such athlete event criteria.

14. The system of claim 1 wherein the user resource manager URM includes a social networking application interface on the mobile computing device configured for receiving social networking data such as status update from the co-resident social networking application or hosted webpage thereon of the player-client, wherein the URM is configured to receive the player-client social networking update and provide the received player-client social networking update as instant player-client data, the player-client reporting data including social networking data updates and the communication action trigger being responsive to the instant player-client data defined as a player-client social networking update.

15. The system of claim 1 wherein the client-player reporting parameter and instant client-player data/update includes news updates made available from a news content server, and wherein the URM receives transmitted instant player-client news update stores such in the player-client profile as instant player-client data, and wherein the alert action communication instruction is generated on the mobile computing device in response to the received instant player-client data being the player-client news update being compared to the communication action trigger that is a news update event trigger as pre-defined in the player-client profile.

16. The system of claim 1 wherein the client-player reporting parameter and instant client-player data/update includes social networking posts, tweets, comments or likes and the URM receives transmitted social networking updates from a social networking content server including player-client data as instant player-client data/updates and stores such in the player-client profile of the URM, and wherein the alert action communication instruction is generated on the mobile computing device in response to the receiving of instant player-client data being received communication action trigger that is a social networking event trigger as defined in the player-client profile.

17. The system of claim 16 wherein the client-player profile reporting parameter of the URM includes an updated social networking influence score and receives from a social networking scoring content server including player-client data, and wherein the URM receives updated social networking influence score as instant player-client, and wherein the alert action communication instruction is generated on the mobile computing device in response to the receiving of the instant player-client data as updated social networking influence score being the communication action trigger that is a social network influence score trigger as defined in the player-client profile.

18. The system of claim 17 wherein the received instant player-client data being social networking influence score is a Klout score, the player-client data is a current Klout score for the player-client, and the communication action trigger is a predefined value to which the received updated social networking influence score is compared.

19. The system of claim 1 wherein the user interface of the URM is configured for receiving user client input for creating one or more of the following: each player-client profile, defining the player-client profile page displays, defining each player-client parameter including each player-client reporting parameter, each communication action trigger, each communication action event and each alert action communication instruction associated therewith.

20. The system of claim 1 wherein the player-client data of the player-client profile includes one or more player-client parameters, player-client reporting parameters, instant player-client data and player-client communication action triggers include one or more parameters defined by a team contract, or a promotions contract and wherein the one or more resource action event and alert action communication instruction include the communication prompt at the mobile computing device to initiate a communication from the mobile computing device of the system user within the URM to a third party communication device.

21. The system of claim 1 wherein the user interface of the URM includes an input screen option for uploading or selecting a co-resident or remotely stored and accessible video clip of the player-client and wherein the player-client profile is configured to store multimedia data files including a video clip and to display the multimedia data files including the video clip on the display in response to the detection of the occurrence of the communication action event.

22. The system of claim 1, further comprising:
a remote device having a system user interface application communicatively interfacing to a plurality of remotely situated User Resource Manager (URM) applications each being associated with a different system user, and a content services interface communicating with one or more content servers with each content server providing player-client data that includes instant player-client data in real time or near real time to a player-client event, the system user interface receiving from one of the URMs a plurality of player-client reporting profiles for a particular system user, each player-client reporting profile for a system user being for a different selected player-client of the system user and having one or more player-client reporting parameters, the content services interface receiving from the content server player-client data associated with at least one of the player-client reporting parameters of a particular one of the player-clients which includes player-client reporting data in at least near real time identifying an activity or event to which the particular player-client is participating, the system user interface transmitting at least a portion of the received player-client reporting data as instant player-client data in at least near real-time to the URM with which the player-client profile is associated;
wherein the remote device being a centralized resource system (CRS) back office server for the URM providing URM application updates, support and business functionality, the remote device having player-client data acquisition manager defining the content services interface for subscribing to or obtaining the player-client reporting data from at least one of the content servers, the player-client data acquisition manager identifying the player-client reporting data and creating therefrom the instant player-client data as a function of the received player-client reporting parameters.

23. The system of claim 22 wherein the player-client data acquisition manager is configured for interfacing and obtain player-client reporting data from a content server selected from the list of servers consisting of a news content server, a sports statistics server, a social networking website server, a scoring server, an influence determination server, and a promotion management server.

24. The system of claim 22 wherein remote device includes a communication system interface for interfacing with a website or communication services server selected from the group consisting of an instant messaging server, a text messaging server, a chat, an email server, a voice telephone call server, a social networking server, and a website server,
and wherein the alert action instruction of the URM includes an automated communication prompt on the mobile computing device enabling the system user to automatically initiate a communication from the mobile computing device of the system user to the player-client within the URM by communicating through the communication interface to the remote device and as established by the communication system interface of the remote device.

25. A system providing a system user integrated player-client management service with enhanced point-to-point communications between a system user and a player-client defined by the system user, the system comprising:
a remote device having a system user application interface communicatively interfacing to a plurality of remotely situated User Resource Manager (URM) applications each being associated with a different system user, and a content services interface configured for communicating with one or more content servers with each content server providing player-client data that includes instant player-client data in real time or near real time to a player-client event, the system user interface receiving from one of the URMs a plurality of player-client reporting profiles for a particular system user, each player-client reporting profile for a system user being for a different player-client previously selected by the system user and having one or more player-client reporting parameters, the content services interface receiving from the content server player-client data associated with at least one of the player-client reporting parameters of a particular one of the player-clients that includes at least near real-time player-client reporting data identifying an activity or event in near real-time to which the particular player-client is participating, the system user interface transmitting at least a portion of the received player-client reporting data as instant player-client data in near real-time to the URM with which the player-client profile is associated; and
the user resource manager (URM) resident on a wireless mobile computing device of a system user having a display and a user interface and being composed of a plurality of resource modules providing a graphical interface in the form of URM pages displayed on the system user computing device display, the mobile computing device having a wireless communications interface providing communications over a wireless communications network separately to a communication device of each player-client for which the system user has pre-selected, the URM including a plurality of player-client profiles with each player-client profile being for one of the player-clients previously selected by the system user and having one or more player-client parameters that includes one or more player-client reporting parameters and one or more player-client communication action triggers, the mobile computing device storing at least one action communication address for each player-client, the URM providing a plurality of player-client profile page displays as a part of the displayed URM pages, the URM transmitting to a remote device at least a portion of the player-client profile for each player-client as the player-client reporting profile including the one or more player-client reporting parameters, in response the URM receiving instant player-client data from the remote device and updating the player-client profile with the instant player-client data, the URM comparing the received instant player-client data with a player-client communication action trigger defined in the player-client profile for detecting in at least near real time an occurrence of a communication action event and, in response to such detecting, generating an alert action communication instruction to a communication component of the mobile computing device of the system user providing an indication on the mobile computing device that the resource action event was detected, in response, the communication component generating a communication prompt on the wireless mobile computing device notifying the system user that the occurrence detection was made and enabling the system user for automatically initiating a communication to the action communication address of the player-client.

26. A method for a user player-client integrated management service with enhanced point-to-point communications between a system user and a player-client defined by the system user, the method comprising:

in a user resource manager (URM) resident on a mobile computing device of a system user having a display and a user interface and being composed of a plurality of resource modules providing a graphical interface in the form of URM pages displayed on the system user mobile computing device display and the mobile computing device having a wireless communications interface providing communications over a wireless communications network to a communication device of each player-clients for which the system user has pre-selected, the URM including a plurality of player-client profiles with each player-client profile being for one of the player-clients previously selected by the system user and having one or more player-client parameters that includes one or more player-client reporting parameters and one or more player-client communication action triggers:

providing a plurality of player-client profile page displays as a part of the displayed URM pages;

transmitting to a remote device at least a portion of the player-client profile for each player-client as the player-client reporting profile including the one or more player-client reporting parameters;

receiving, in response to the transmitting, instant player-client data from the remote device;

updating, in response to the received instant player-client data, the player-client profile with the instant player-client data;

comparing the received instant player-client data with a player-client communication action trigger defined in the player-client profile;

detecting in at least near real time an occurrence of a communication action event responsive to the comparing; and generating, in response to the detecting, an alert action communication instruction to a component of the mobile computing device of the system user providing an indication on the mobile computing device that the resource action event was detected;

in response thereto, in the communication component of the mobile computing device:

generating a communication prompt on the wireless mobile computing device notifying the system user that the occurrence detection was made and enabling the system user for automatically initiating a communication to the action communication address of the player-client.

27. A method providing a user integrated player-client management service with enhanced point-to-point communications between a system user and a player-client defined by the system user, the method comprising:

a) in a remote device having a system user application interface communicatively interfacing to a plurality of remotely situated User Resource Manager (URM) applications each being associated with a different system user, and a content services interface configured for communicating with one or more content servers with each content server providing player-client data that includes instant player-client data in real time or near real time to a player-client event:

receiving at the system user interface from one of the URM's a plurality of player-client reporting profiles for a particular system user, the player-client reporting profile being for a different player-client previously selected by the system user and having one or more player-client reporting parameters;

receiving from the content server player-client data associated with at least one of the player-client reporting parameters of a particular one of the player-clients that includes at least near real-time player-client reporting data identifying an activity or event in near real-time to which the particular player-client is participating; and transmitting at least a portion of the received player-client reporting data as instant player-client data in near real-time to the URM with which the player-client profile is associated; and b) in a user resource manager (URM) resident on a mobile computing device of a system user having a display and a user interface and being composed of a plurality of resource modules providing a graphical interface in the form of URM pages displayed on the system user mobile computing device display and the mobile computing device having a wireless communications interface providing communications over a wireless communications network to a communication device of each player-clients for which the system user has pre-selected, the URM including a plurality of player-client profiles with each player-client profile being for one of the player-clients previously selected by the system user and having one or more player-client parameters that includes one or more player-client reporting parameters and one or more player-client communication action triggers:

providing a plurality of player-client profile page displays as a part of the displayed URM pages;

transmitting to a remote device at least a portion of the player-client profile for each player-client as the player-client reporting profile including the one or more player-client reporting parameters;

receiving, in response to the transmitting, instant player-client data from the remote device;

updating, in response to the received instant player-client data, the player-client profile with the instant player-client data;

comparing the received instant player-client data with a player-client communication action trigger defined in the player-client profile;

detecting in at least near real time an occurrence of a communication action event responsive to the comparing; and generating, in response to the detecting, an alert action communication instruction to a component of the mobile computing device of the system user providing an indication on the mobile computing device that the resource action event was detected;

in response thereto, in the communication component of the mobile computing device:

generating a communication prompt on the wireless mobile computing device notifying the system user that the occurrence detection was made and enabling the system user for automatically initiating a communication to the action communication address of the player-client.

* * * * *